(12) United States Patent
Folch et al.

(10) Patent No.: US 12,491,514 B2
(45) Date of Patent: Dec. 9, 2025

(54) DEVICE, SYSTEM, AND METHOD FOR TRAPPING TISSUE SAMPLES

(71) Applicant: University of Washington, Seattle, WA (US)

(72) Inventors: Albert Folch, Seattle, WA (US); Adan Rodriguez, Seattle, WA (US); Lisa Horowitz, Seattle, WA (US); Allan Sung King Au-Yeung, Seattle, WA (US); Priscilla Delgado, Seattle, WA (US)

(73) Assignee: University of Washington, Seattle, WA (US)

( * ) Notice: Subject to any disclaimer, the term of this patent is extended or adjusted under 35 U.S.C. 154(b) by 770 days.

(21) Appl. No.: 17/761,552

(22) PCT Filed: Sep. 18, 2020

(86) PCT No.: PCT/US2020/051536
§ 371 (c)(1),
(2) Date: Mar. 17, 2022

(87) PCT Pub. No.: WO2021/061522
PCT Pub. Date: Apr. 1, 2021

(65) Prior Publication Data
US 2022/0362765 A1 Nov. 17, 2022

Related U.S. Application Data

(60) Provisional application No. 62/906,626, filed on Sep. 26, 2019.

(51) Int. Cl.
*B01L 3/00* (2006.01)

(52) U.S. Cl.
CPC .... *B01L 3/50273* (2013.01); *B01L 2400/0475* (2013.01)

(58) Field of Classification Search
None
See application file for complete search history.

(56) References Cited

U.S. PATENT DOCUMENTS

2010/0291584 A1    11/2010   Tseng et al.
2012/0195810 A1*   8/2012   Cohen ................... B01L 3/5027
                                                                                                                          156/281

(Continued)

FOREIGN PATENT DOCUMENTS

WO      2013/184527 A1    12/2013
WO      WO-2018094113 A1 *   5/2018  ......... B01L 3/502715

(Continued)

OTHER PUBLICATIONS

Lee PJ, Ghorashian N, Gaige TA, Hung PJ. Microfluidic System for Automated Cell-based Assays. JALA Charlottesv Va. Dec. 2007; 12(6):363-367. doi: 10.1016/j.jala.2007.07.001. PMID: 18172509; PMCID: PMC2171033. (Year: 2008).*

(Continued)

*Primary Examiner* — Lyle Alexander
*Assistant Examiner* — Mickey Huang
(74) *Attorney, Agent, or Firm* — Christensen O'Connor Johnson Kindness PLLC

(57) ABSTRACT

Devices, systems, and methods for trapping and manipulating portions of tissue are described. In an embodiment, the devices include an array of traps, wherein traps of the array of traps are shaped to trap a tissue sample; and a well is in registry and fluidic communication with a trap of the array of traps.

17 Claims, 37 Drawing Sheets

(56) References Cited

U.S. PATENT DOCUMENTS

| | | | |
|---|---|---|---|
| 2015/0360224 A1 | 12/2015 | Zhang et al. | |
| 2016/0236195 A1 | 8/2016 | Daridon | |
| 2019/0000431 A1 | 1/2019 | Shepherd et al. | |
| 2023/0145727 A1* | 5/2023 | Solomon | B01L 3/502738 422/505 |

FOREIGN PATENT DOCUMENTS

| | | |
|---|---|---|
| WO | 2018/140497 A1 | 8/2018 |
| WO | 2018/213357 A1 | 11/2018 |
| WO | 2019/094775 A1 | 5/2019 |

OTHER PUBLICATIONS

Tan et al., A trap-and-release integrated microfluidic system for dynamic microarray applications, 2007, PNAS, vol. 104, No. 4, 1146-1151 (Year: 2007).*

Chang, H. et al., "Multilayer architecture microfluidic network array for combinatorial drug testing on 3D-cultured cells," Biofabrication, 11 (2019) 053024, Jun. 4, 2019, 14 pages.

Gencturk, E. et al., "Advances in microfluidic devices made from thermoplastics used in cell biology and analyses," Boimicrofluidics, 11 051502 (2017): 051502-1-051502-41.

Lee, P. J. et al., "Microfluidic System for Automated Cell-based Assays," National Institute of Health, 12(6): 363-367.

Neal, J. T. et al., "Organoid modeling of the tumor immune microenvironment," Department of Health & Human Services, Dec. 13, 2018; 175(7): 1972-1988.

Rodriguez, A.D. et al., "A microfluidic platform for functional testing of cancer drugs on intact tumor slices," Royal Society of Chemistry, Lab Chip, 2020, 20, 1658-1675.

Shanks, N. et al., "Are animal models predictive for humans?," BioMed Central, Philosophy, Ethics, and Humanities in Medicine 2009, 4:2, 1-20.

Simeone, K. et al., "Paraffin-embedding lithography and micro-dissected tissue micro-arrays: tools for biological and pharmacological analysis of ex vivo solid tumors," Royal Chemistry of Chemistry, Lab Chip, 2019, 19, 693-705.

Tan, W. and Shoji Takeuchi, "A trap-and-release integrated microfluidic system for dynamic microarray applications," PNAS, Jan. 23, 2007; 104(4): 1146-1151.

Wei, X. et al., "A Multiwell-Based Detection Platform with Integrated PDMC Concentrators for Rapid Multiplexed Enzymatic Assays," Scientific Reports, (2018) 8:10772: 1-11.

\* cited by examiner

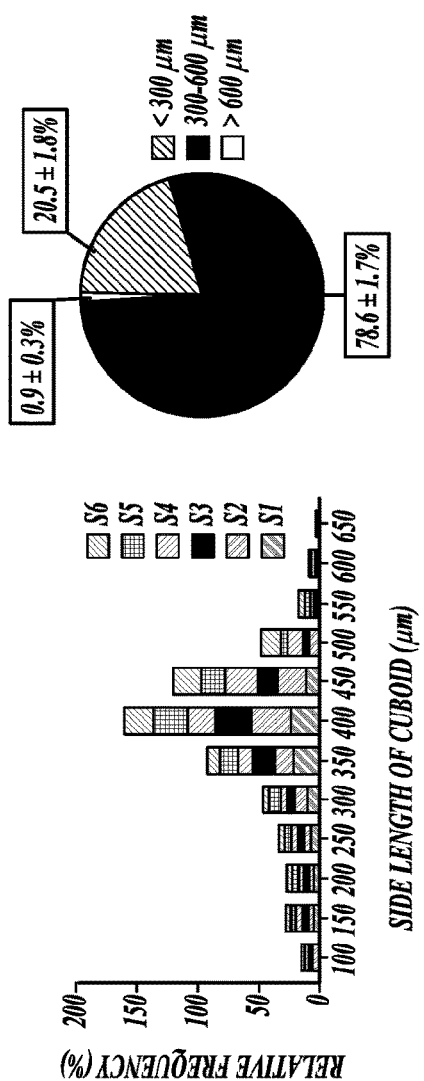
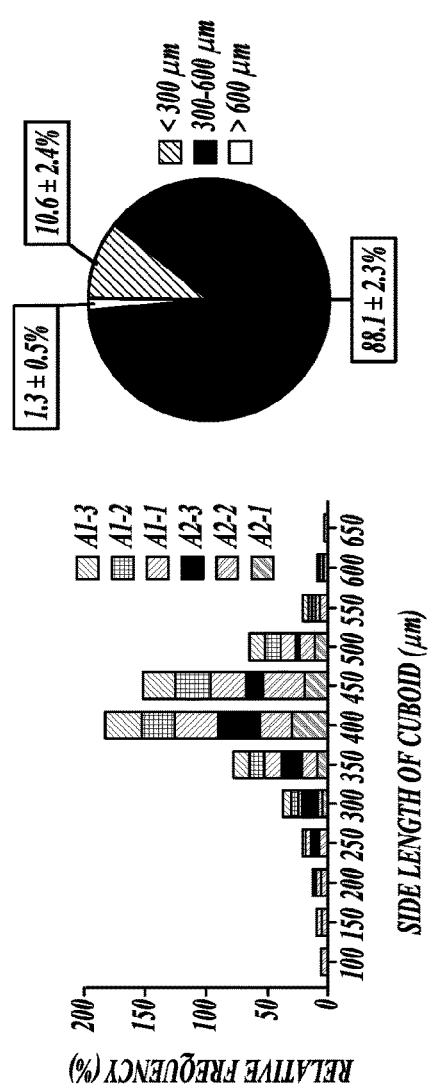
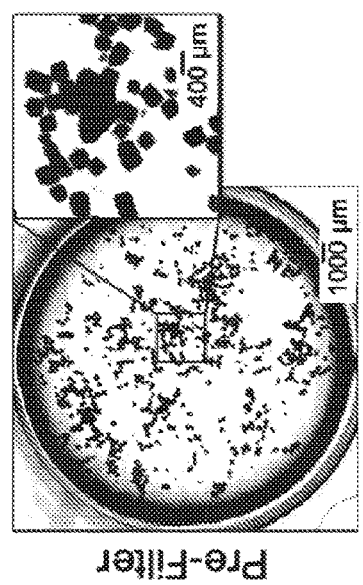
FIG. 5F
FIG. 5G
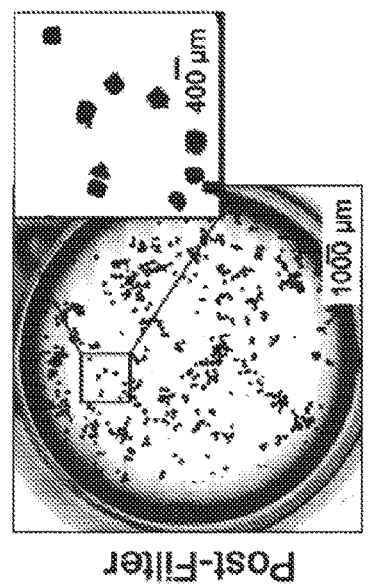
FIG. 5H
FIG. 5I

CT GREEN OR ORANGE          CT GREEN OR ORANGE

+SYTOX GREEN, HOECHST

DEVICE, SYSTEM, AND METHOD FOR TRAPPING TISSUE SAMPLES

CROSS-REFERENCES TO RELATED APPLICATIONS

This application is a National Stage of International Application No. PCT/US2020/051536 filed Sep. 18, 2020, which claims the benefit of U.S. Provisional Application No. 62/906,626, filed Sep. 26, 2019, which is incorporated herein by reference in its entirety.

STATEMENT OF GOVERNMENT LICENSE RIGHTS

This invention was made with government support under Grant No. R01 CA181445, awarded by the National Institutes of Health. The government has certain rights in the invention.

BACKGROUND

Pre-clinical animal tests fall short as predictors of efficacy, toxic doses, and drug metabolism later observed in human trials. If systems can be developed that accurately predict drug responses in human, advances in drug treatment or prevention would be dramatically streamlined, and time frames for drug development shortened considerably. The ultimate benefit for patients would be immense.

Functional assays can potentially complement and extend genomics-based approaches for personalized oncology by capturing key determinants of therapeutic response such as tissue architecture, tumor heterogeneity, and the tumor microenvironment (TME). Microfluidic technology is well suited for the challenge of delivering minute amounts of drugs to small tissue biopsies, such as live human tissue, which is almost always available only in very limited amounts.

An acute challenge in functional precision cancer medicine arises from the fact that dissociated cells are generally insufficient for the functional assays; to preserve the TME, these assays should be performed on intact tissue, whose availability is scarce.

SUMMARY

The present disclosure addresses these and related needs and challenges by providing, in various aspects, devices, systems and methods for trapping portions of tissue samples, such as intact portions of tissue samples, for manipulation.

Accordingly, in an aspect, the present disclosure provides a fluidic device for trapping tissue samples and portions thereof. In an embodiment, the fluidic device comprises an array of traps, wherein traps of the array of traps are shaped to trap a tissue sample; and a well is in registry and fluidic communication with a trap of the array of traps.

In another aspect, the present disclosure provides a system for trapping tissue samples and portions thereof. In an embodiment, the system includes a fluidic device comprising an array of traps and a tissue cutting device configured to cut a tissue sample into approximately regular portions shaped to fit within a trap of the array of traps. In an embodiment, the fluidic device is a fluidic device according to any embodiments of the fluidic devices of the present disclosure.

In yet another aspect, the present disclosure provides a method of manipulating a tissue sample. In the embodiment, the method comprises flowing a fluid suspension comprising a tissue sample through the channel of a fluidic device, thereby trapping the tissue sample in a trap of the fluidic device; and exposing the trapped tissue sample to a compound by depositing a solution comprising the compound into a well in registry and fluidic communication with the trap. In an embodiment, the method comprises using a fluidic device according to any embodiments of the fluidic devices of the present disclosure.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 5F is an image of sliced tissue portions, according to an embodiment of the disclosure;

FIG. 5G graphically illustrates relative size frequency compared to side length of portioned tissue samples of FIG. 5F, in accordance with an embodiment of the disclosure;

FIG. 5H is an image of the sliced tissue portions of FIG. 5F after filtration, in accordance with an embodiment of the disclosure;

FIG. 5I graphically illustrates relative size frequency compared to side length portioned tissue samples of FIG. 5H, in accordance with an embodiment of the disclosure;

DETAILED DESCRIPTION

As discussed further herein, conventional devices, systems, and methods for assaying or manipulating portions of tissue samples do not sufficiently mimic tissue samples in their native environment. Additionally, such conventional devices, systems, and methods are not capable of easily and selectively addressing portions of a tissue sample with, for example, drug candidate and imaging reagents. Further, such conventional devices, systems, and methods have low throughput.

The devices, systems, and methods of the present disclosure address these and related needs, as discussed further herein.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

Fluidic Devices

In an aspect, the present disclosure provides a fluidic device for trapping tissue samples and portions thereof. As discussed further herein, the fluidic device is suitable for trapping or otherwise immobilizing a tissue sample or portion thereof, such as for further manipulation and/or study.

The traps of the fluidic device can be any trap suitable to immobilize a tissue sample or portion thereof. In an embodiment, the trap is configured to immobilize a cuboidal portion of a tissue sample, such as a cuboidal portion of a tissue sample cut using a tissue cutting device according to the embodiments discussed further herein with respect to the systems of the present disclosure. In an embodiment, trap is selected from the group consisting of an optical trap, an ultrasound trap, a magnetic trap, and a fluidic trap. In an embodiment, the trap is a fluidic trap.

Figure 1A:
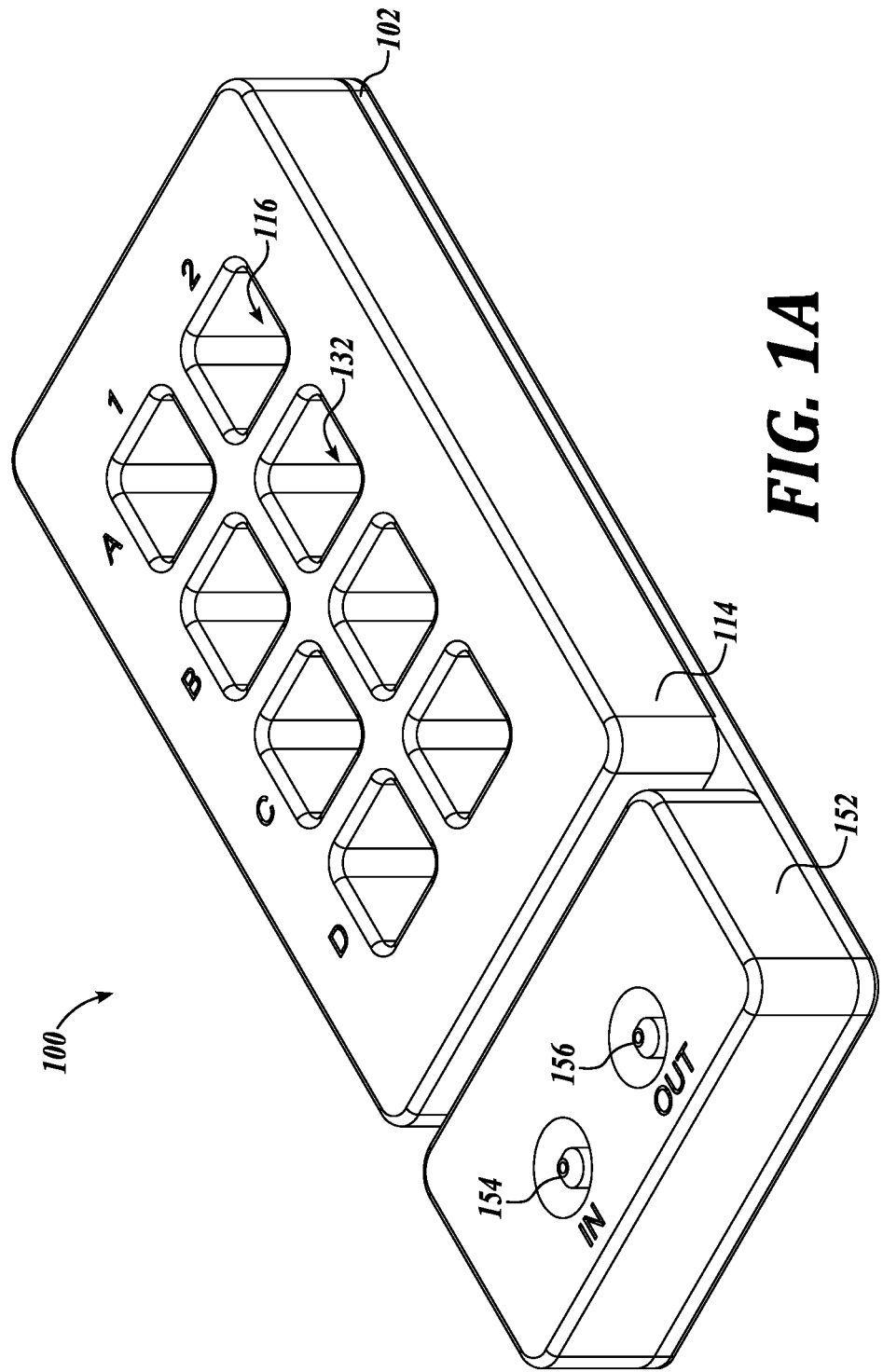
FIG. 1A is a perspective view of a fluidic device, according to an embodiment of the disclosure.
Figure 1B:
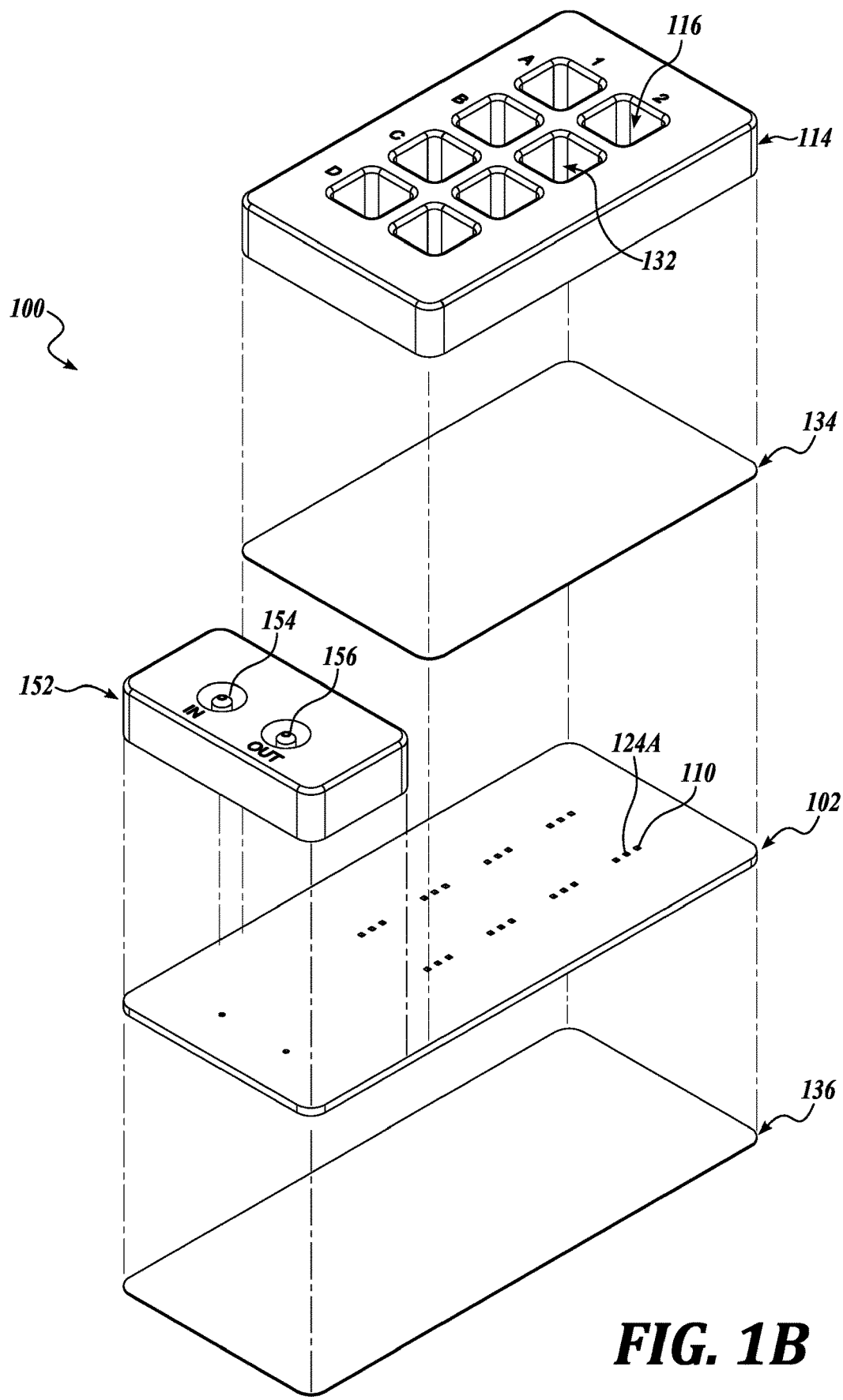
FIG. 1B is an exploded perspective view of the fluidic device of FIG. 1A, according to an embodiment of the disclosure.
Figure 1C:
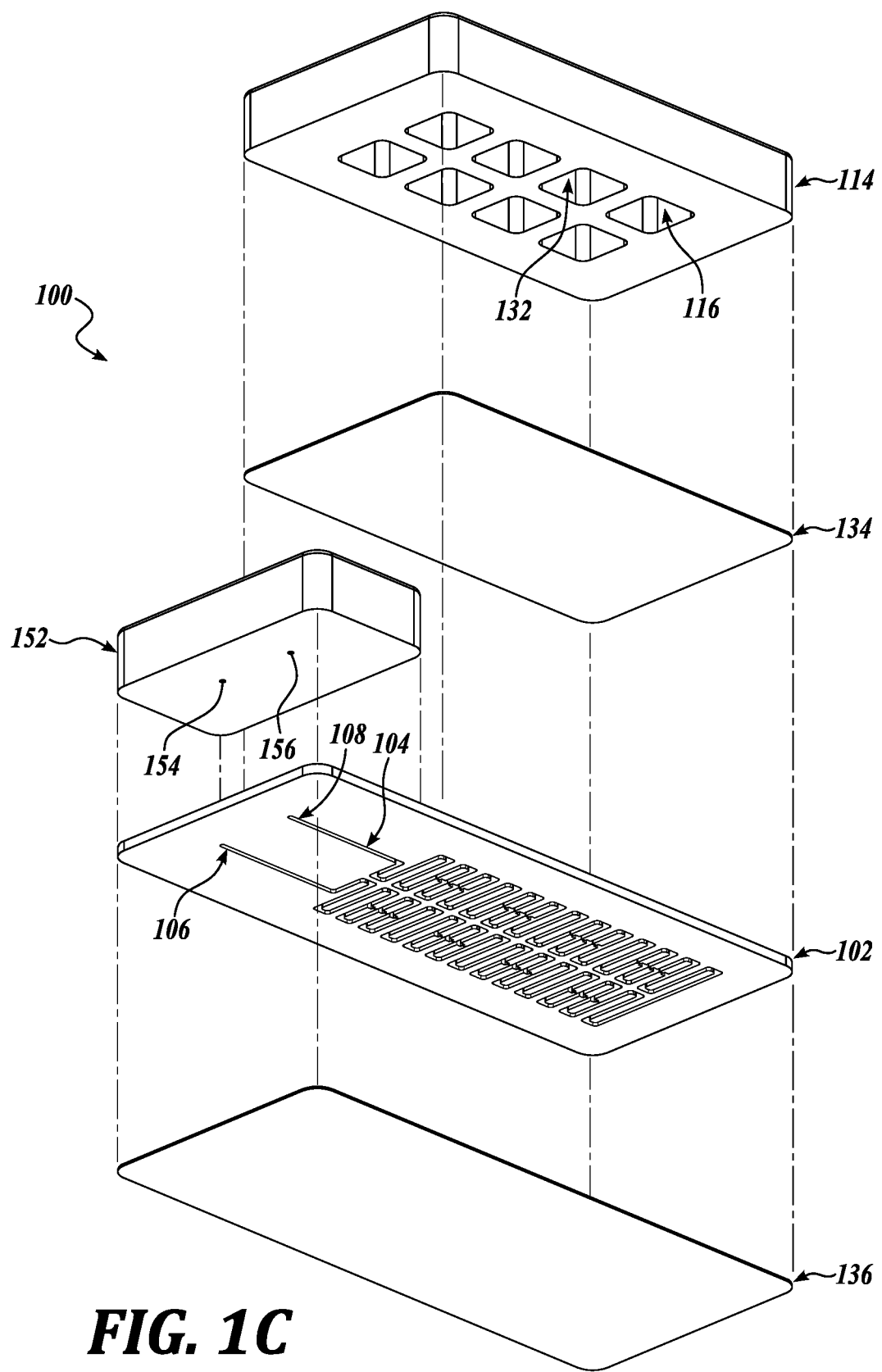
FIG. 1C is another exploded perspective view of the fluidic device of FIG. 1A, according to an embodiment of the disclosure.
Figure 1D:
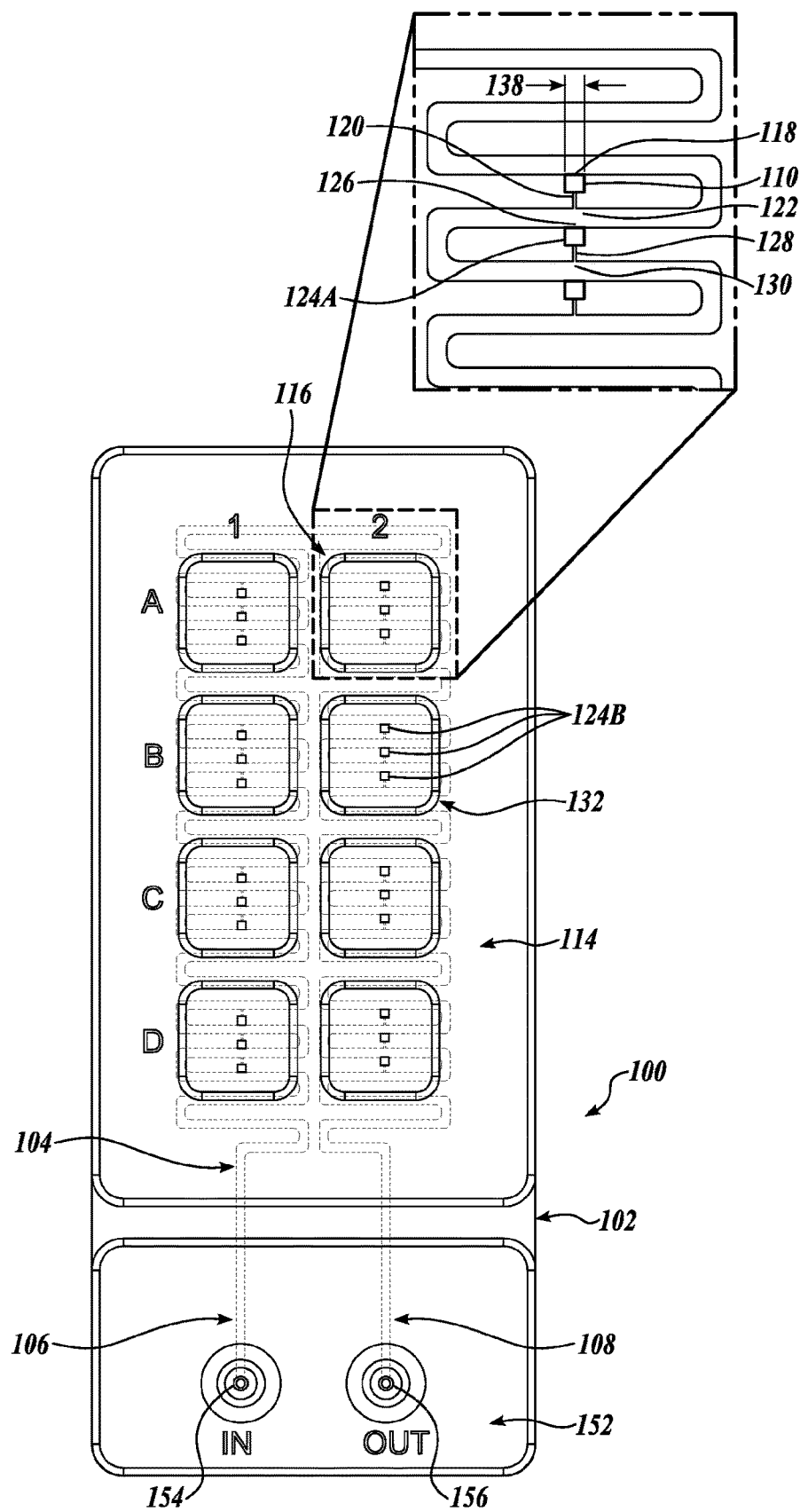
FIG. 1D is a top-down plan view of the fluidic device of FIG. 1A including a magnified view, according to an embodiment of the disclosure.

In an embodiment, the fluidic device comprises an array of traps, wherein traps of the array of traps are shaped to trap a tissue sample; and a well is in registry and fluidic communication with a trap of the array of traps. In that regard, attention is directed to FIGS. 1A-1D in which a fluidic device 100, in accordance with an embodiment of the disclosure, is illustrated. FIG. 1A is a perspective view of the fluidic device 100. FIG. 1B is an exploded perspective view of the fluidic device 100. FIG. 1C is another exploded perspective view of the fluidic device 100. FIG. 1D is a top-down plan view of the fluidic device 100.

As shown, the fluidic device 100 includes a fluidic layer 102 comprising a channel 104 having an upstream end 106 and a downstream end 108 opposite the upstream end 106, wherein traps 110 of the array of traps are in fluidic communication with the channel 104; and a well-plate layer 114 defining the well, wherein the well-plate layer 114 is couplable to the fluidic layer 102 to place the well 116 in registry with a trap 110 of the array of traps. The fluidic device 100 is also shown to include a floor layer couplable to a side of the fluidic layer 102 opposite the well-plate layer 114, and a roof layer 134 disposed between the well-plate layer 114 and the fluidic layer 102.

In the illustrated embodiment, traps 110 of the array of traps define harbors or cutouts in the channel 104. In this regard, portions of tissue flowing through the channel 104 may settle into the traps 110 and, thereby, be immobilized within the traps 110. In an embodiment, the trap 110 has a feature size 138 in a range of about 50 μm to about 800 μm, 200 μm to about 600 μm, 75 μm to about 600 μm, 100 μm to about 500 μm, 100 μm to about 250 μm, or 50 μm to about 150 μm. Such feature sizes can include, for example, one or more of a width, a height, and a length defined by the harbor or cutout of the trap 110. In this regard, the trap 110 having such a feature size 138 is configured to trap or immobilize a portion of tissue having a feature size 138 smaller than the feature size 138 of the trap 110.

As shown, a trap 110 of the array of traps is in fluidic communication with the channel 104 at a first portion 118. The fluidic layer 102 is further shown to define a trap channel 120 in fluidic communication with the trap 110 and the channel 104 at a second portion 122 downstream from the first portion 118. In an embodiment, the trap channel 120 has a fluidic resistance lower than a fluidic resistance of a portion of the channel 104 between the first portion 118 and the second portion 122. See, for example, FIG. 7B. In this regard, a portion of tissue sized to fit within the trap 110 is hydrodynamically urged into the open trap 110 as more fluid will flow through the trap channel 120 than the portion of the channel 104 between the first portion 118 and second portion 122, since the trap channel 120 has a lower fluid resistance. See, for example, FIG. 7A. Once disposed within the trap 110, the tissue portion is generally trapped or immobilized to due, for example, to fluid forces from the fluid flowing through the channel 104. Accordingly, immobilization of portions of tissue is, in this regard, automated.

Once the trap 110 is filled with a portion of tissue, a higher fluid resistance through the trap 110 and the trap channel 120, leads fluid, and additional portions of tissue suspended therein, to bypass of the trap 110 for downstream portions of the channel 104.

As above, the fluidic layer 102 defines an array of traps. In an embodiment, the traps 110 of the array of traps are each shaped and positioned to trap or otherwise immobilize portions of tissue. In the illustrated embodiment, the fluidic layer 102 is shown to further define a second trap 124a of the array of traps. As shown, the second trap 124a is in fluidic communication with the channel 104 and positioned at a third portion 126 downstream from the first portion 118. The fluidic layer 102 further comprises a second trap channel 128 in fluidic communication with the second trap 124a and the channel 104 at a fourth portion 130 downstream from the third portion 126. In this regard, the second trap 124a is shaped and positioned to fluidically trap a portion of tissue and the fluidic layer 102 is configured to trap multiple portions of tissue sequentially as a suspension of such portions of tissue is flowed through the channel 104. See also FIG. 7A.

In an embodiment, traps 110 of the array of traps have substantially similar shapes and dimensions. In this regard, the traps 110 of the array of traps are shaped to accept and immobilize portions of tissue having correspondingly substantially similar shapes and dimensions. Such an array of traps is suitable to sequentially trap portions of tissue cut by, for example, a tissue cutting device, such as a tissue cutting device 340 discussed further herein with respect the system 301 of the present disclosure. In an embodiment, the traps 110 of the array of traps are substantially cuboidal and shaped to trap cuboidally shaped portions of tissue. While cuboidal portions of tissue are described herein, it will be understood that traps 110 do not necessarily need to be cuboidally shaped to trap cuboidal portions of tissue. Likewise, it will be understood that cuboidally shaped traps 110 are suitable to trap portions of tissue that are not themselves cuboidal.

As above, the fluidic device 100 includes or otherwise defines a well 116 is in registry and fluidic communication with a trap 110 of the array of traps. In the illustrated embodiment, the fluidic device 100 comprises a well-plate layer 114 defining the well. The well 116 is suitable to hold a fluid therein, such as when coupled to the fluidic layer 102, thereby applying or contacting a portion of tissue disposed within the trap 110 with the fluid. As discussed further herein with the EXAMPLES of the present disclosure, such a fluid can contain a drug candidate, dye, etc. for manipulating the trapped portion of tissue.

In the illustrated embodiment, the well 116 is in registry with and fluidic communication with a number of traps 110 of the array of traps. In this regard, a single well 116 is configured to apply a solution to a number of portions of tissue immobilized in separate traps 110 in fluidic communication with the well 116. This may be useful in increasing the number of portions of tissue assayed by a single compound.

In an embodiment, the well 116 is a first well 116, and wherein the well-plate layer 114 defines a second well 132 in registry and fluidic communication with the second trap 124b when the well-plate layer 114 is coupled to the fluidic layer 102. In this regard, trapped portions of tissue can be separately assayed with a variety of compounds. As shown, the well-plate layer 114 defines a number of wells, each in fluidic communication with traps 110 and 124a of the array of traps. In the illustrated embodiment, the well-plate layer 114 further includes markings, here letters and numbers, identifying, such as for a user, the wells of the well-plate layer 114. Such markings are suitable to guide a user in applying or disposing particular compounds in particular wells.

In the illustrated embodiment, the well-plate layer 114 defines 8 wells in a standard multi-well format. While 8 wells are illustrated, it will be understood that other well configurations are possible and within the scope of the present disclosure. In an embodiment, a number of well plates of the well-plate layer 114 is 2, 4, 6, 8, 32, 64, 96, 128, 384, or 1536. In an embodiment, a number of well plates of the well-plate layer 114 is in a range of 1 to 10, 1 to 25, 1 to 50, 1 to 75, 1 to 100, 1 to 250, 1 to 500, 1 to 1,000, or more.

The illustrated well-plate layer 114 is shown to define a number of wells shaped to accept a fluid for receipt by traps 110 in registry and fluidic communication with the wells. While a well-plate layer 114 is illustrated, it is understood that, in certain embodiments, the wells, channels, and traps are defined by a single, contiguous structure. In an embodiment, the well 116 is inflatable to define the well.

The fluidic device 100 is shown to include a roof layer 134 removably couplable to a side of the fluidic layer 102 couplable to the well-plate layer 114, wherein the roof layer 134 is configured to cover and be in fluidic communication with the trap 110 when coupled to the fluidic layer 102. Such a roof layer 134 may be suitable to cover the fluid layer during flow and trapping of the portions of tissue within the fluidic layer 102. In an embodiment, the roof layer 134 is suitable to transmit compounds from a solution in a well 116 and into the channel 104 and portions of tissue immobilized in a trap 110.

The fluidic device 100 is further shown to include a floor layer 136, such as, in an embodiment, a gas-permeable floor layer 136. In an embodiment, the gas-permeable floor layer 136 is configured to convey gas, and, in certain embodiments, liquids in contact with the gas-permeable floor layer 136, such that such gasses or liquids are transmitted to within the channel 104 and portions of tissue trapped therein.

In the illustrated embodiment, the fluidic device 100 further includes a fluid input/output manifold 152 including an input aperture 154 in fluidic communication with an upstream end 106 of the channel 104 and an output aperture 156 in fluidic communication with the downstream end 108 of the channel 104. In this regard, the input aperture 154 is configured to direct fluid, such as a fluid comprising a suspension of portions of tissue, into and through the channel 104 and out of the output aperture 156. While tissue suspensions are discussed further herein, the fluid input-output manifold 152 is also suitable to contact trapped portions of tissue within the fluidic layer 102 with compounds to further manipulate the trapped portions of tissue and/or extracellular matrix polymers, as discussed further herein.

Figure 2A:
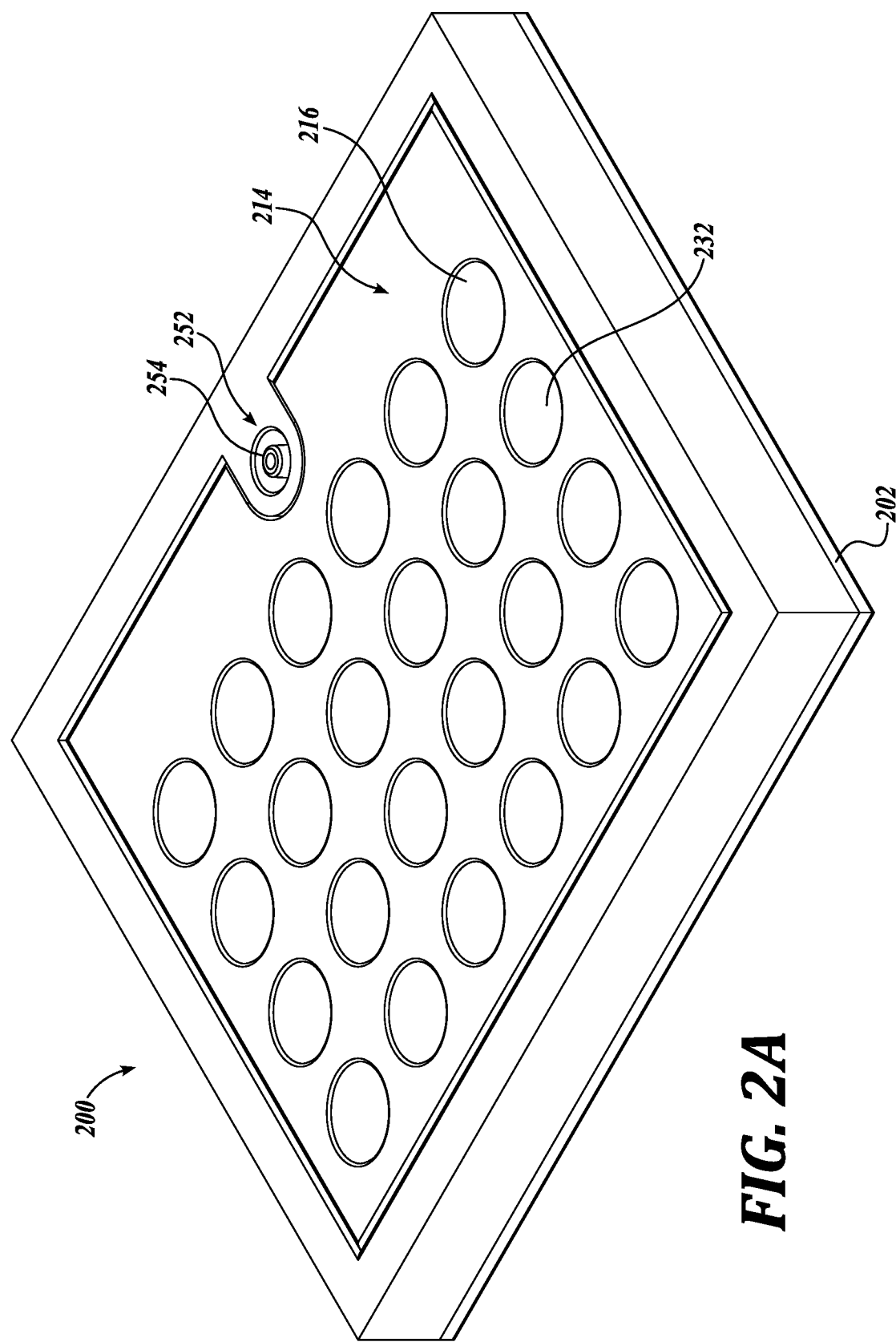
FIG. 2A is a perspective view of another fluidic device, according to an embodiment of the disclosure.
Figure 2B:
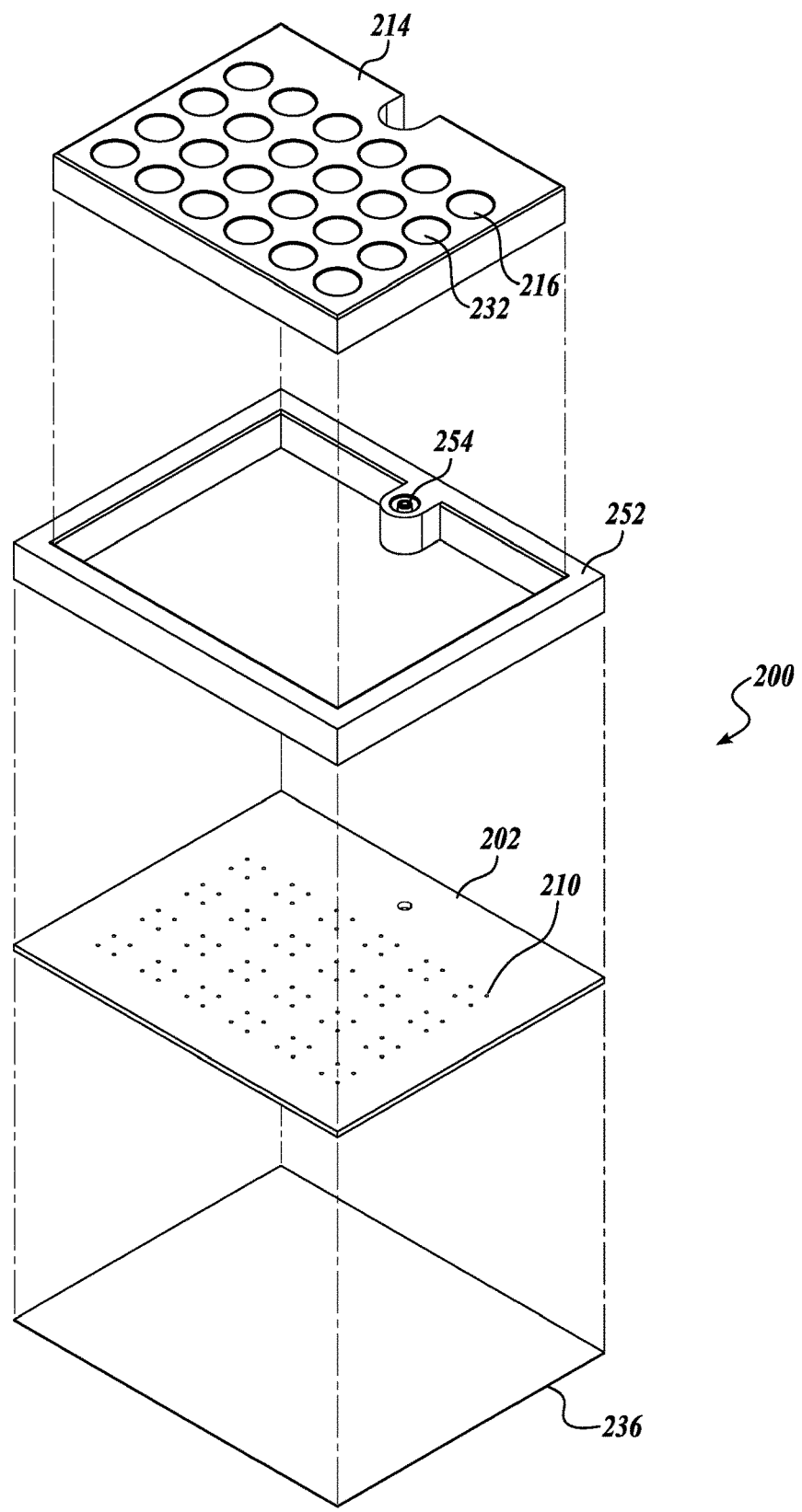
FIG. 2B is an exploded perspective view of the fluidic device of FIG. 2A, according to an embodiment of the disclosure.
Figure 2C:
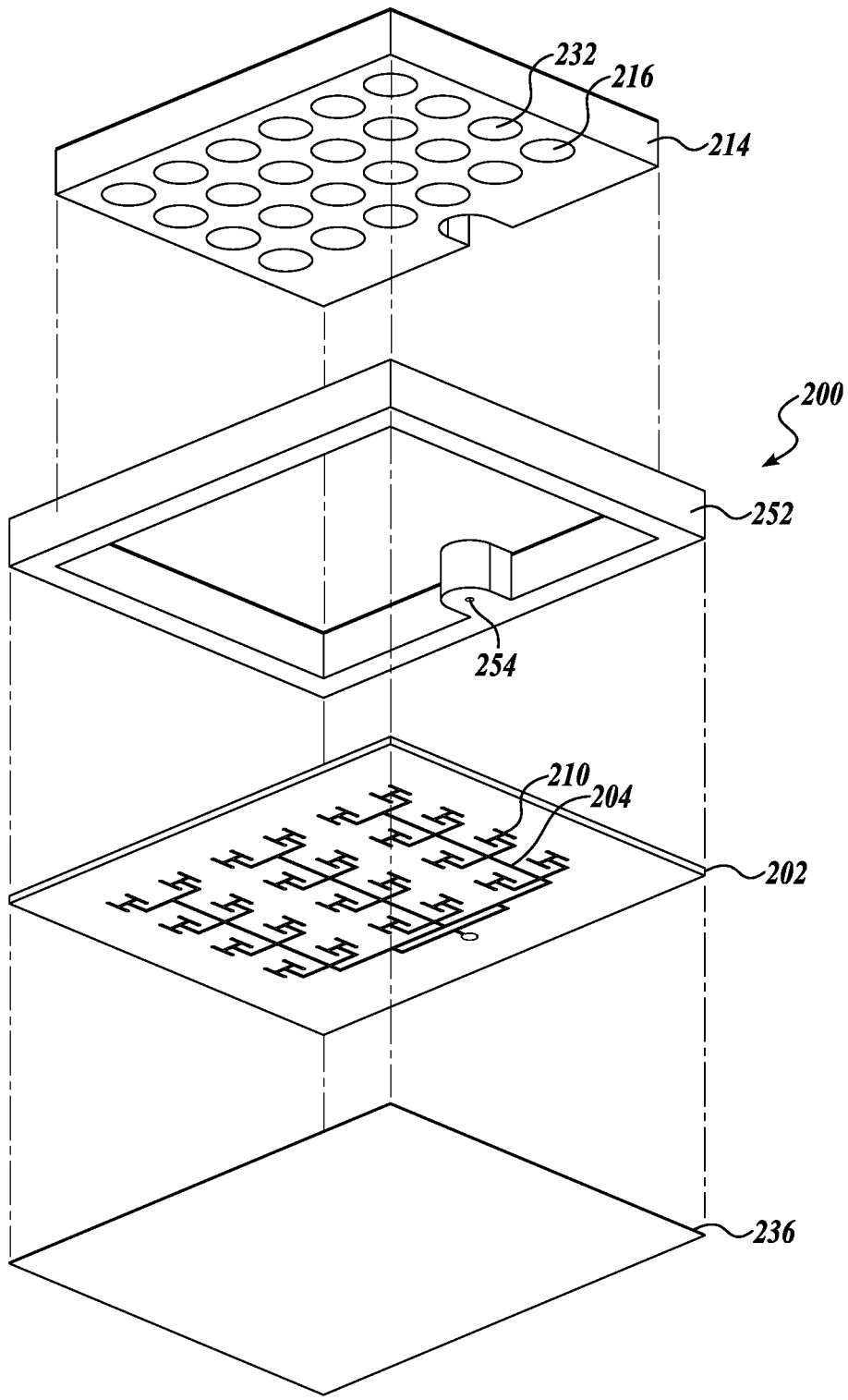
FIG. 2C is another exploded perspective view of the fluidic device of FIG. 2A, according to an embodiment of the disclosure.
Figure 2D:
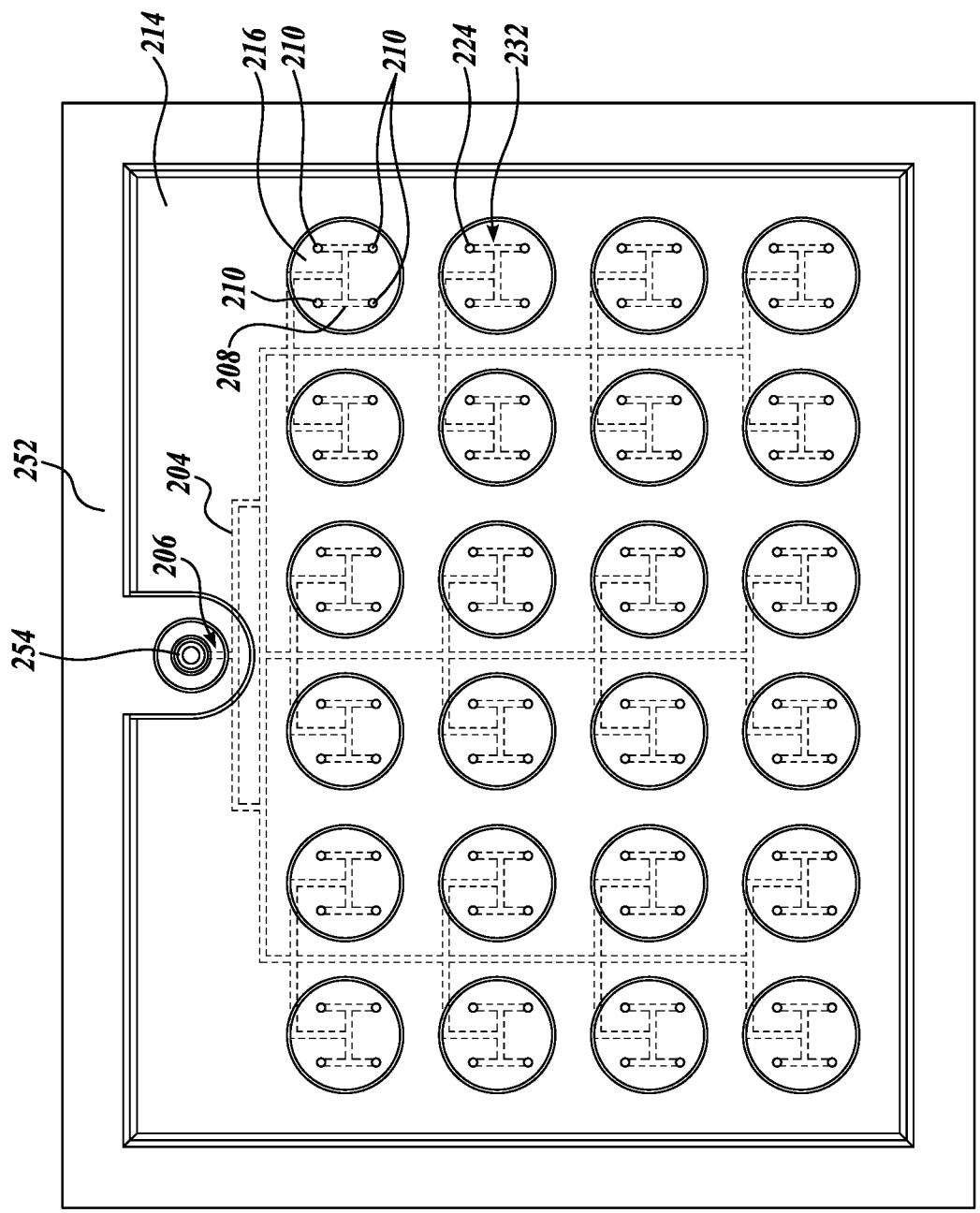
FIG. 2D is a top-down plan view of the fluidic device of FIG. 2A, according to an embodiment of the disclosure.
Figure 2E:
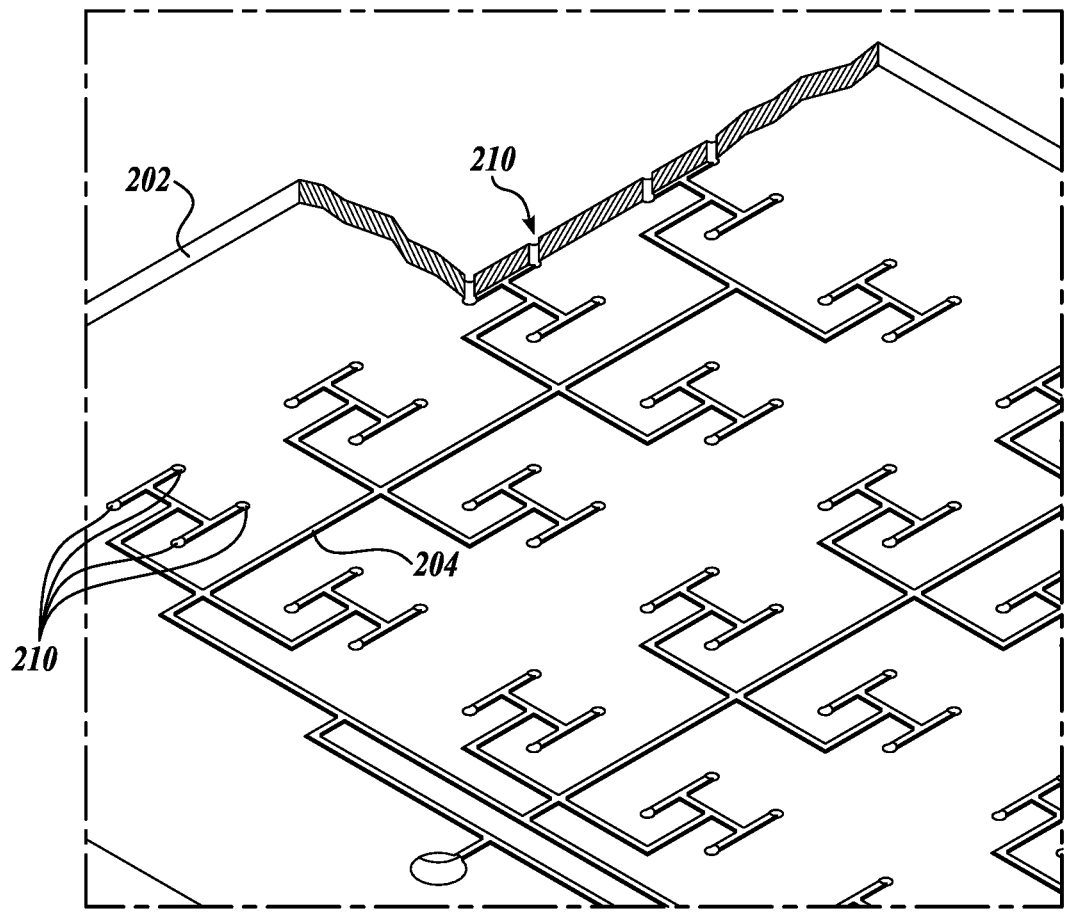
FIG. 2E is a perspective view of a fluidic layer of the fluidic device of FIG. 2A with a partial cross-section view, according to an embodiment of the disclosure.

In an embodiment, the fluidic devices of the present disclosure include a trap including an aperture shaped to trap or otherwise immobilize a portion of tissue. In this regard, attention is directed to FIGS. 2A-2E in which a fluidic device 200, in accordance with an embodiment of the disclosure, is illustrated. FIG. 2A is a perspective view of another fluidic device 200. FIG. 2B is an exploded perspective view of the fluidic device 200. FIG. 2C is another exploded perspective view of the fluidic device 200. FIG. 2D is a top-down plan view of the fluidic device 200. FIG. 2E is a perspective view of a fluidic layer 202 of the fluidic device 200.

The fluidic device 200 is shown to include an array of traps, wherein traps 210 of the array of traps are shaped to trap a tissue sample; and a well 216 is in registry and fluidic communication with a trap 210 of the array of traps. In the illustrated embodiment, the fluidic device 200 is shown to include a fluidic layer 202 comprising a channel 204 having an upstream end 206 and a downstream end 208 opposite the upstream end 206, wherein traps 210 of the array of traps are in fluidic communication with the channel 204, and a well-plate layer 214 defining the well 216, wherein the well-plate layer 214 is couplable to the fluidic layer 202 to place the well 216 in registry with a trap 210 of the array of traps.

The fluidic device 200 is also shown to include a fluid input/output manifold 252 defining an output aperture 254 shaped to be in fluidic communication with an upstream end 206 of the channel 204 when the fluid input/output manifold 252 is coupled to the fluidic layer 202. As shown, the fluidic device 200 further includes a floor layer, such as an optically clear floor layer 236, couplable to a side of the fluidic layer 202 opposite the well-plate layer 214. In an embodiment, the floor layer 236 is gas-permeable. As discussed further herein with respect to FIGS. 1A-1D, in an embodiment, the gas-permeable floor layer 236 is permeable to gases but not liquids, such as to convey gases through the floor layer 236. In an embodiment, the floor layer 236 is configured to permit flow of fluids, for example for movement of liquids with compounds, from the fluid above or for establishment of reverse flow to dislodge tissue from the traps. In an embodiment, the gas-permeable floor layer 236 is suitable for gas exchange to perform cell culture within the fluidic device 200.

As above, the fluidic layer 202 defines an array of traps, wherein traps 210 of the array of traps are shaped to trap a tissue sample. As shown in, for example, FIGS. 2D and 2E, the fluidic layer 202 defines a channel 204, which bifurcates repeatedly as the channel 204 proceeds from the upstream end 206 downstream. The bifurcated channel 204 is further shown to terminate in a number of apertures defining, at least in part, the traps 210. In use, a suspension of portions of tissue is disposed into the large area defined by 252, or into the wells 232, and a vacuum source is applied to the outlet aperture 254 to draw fluid through the channel 204, thus trapping tissue portions in the traps 210 and blocking the trap 210 with the portion of tissue, after which the well layers 242 comprising the wells such as 232 may be applied.

In an embodiment, these apertures have a feature size, such as a diameter, width, length, and the like, which is smaller than a corresponding feature size of a portion of tissue. Such a feature size of the portion of tissue may be defined, at least in part, by a tissue cutting device, such as a tissue cutting device discussed further herein with respect to FIG. 3. In an embodiment, a feature size of the apertures is in a range of about 50 µm to about 800 µm, 200 µm to about 600 µm, 75 µm to about 600 µm, 100 µm to about 500 µm, 100 µm to about 250 µm, or 50 µm to about 150 µm.

As above, the fluidic device 200 includes a well 216 in registry and fluidic communication with a trap 210 of the array of traps. In this regard, one or a number of traps 210 in fluidic communication with a well 216 can be selectively addressed or manipulated, such as by placing a solution comprising a compound into the well, thereby contacting a portion of tissue trapped in the trap 210 with the compound.

In the illustrated embodiment, the fluidic device 200 includes a well-plate layer 214 defining a number of wells. As shown, the well-plate layer 214 is couplable to the fluidic layer 202, and when coupled, a well 216 of the well-plate layer 214 is in registry with a trap 210 of the array of traps. In the illustrated embodiment, the fluidic layer 202 defines four apertures in fluidic communication with each well 216 and 232 of the well-plate layer 214 when the fluidic layer 202 and well-plate layer 214 are coupled. While four apertures in fluidic communication with a single well 216 of the well-plate layer 214 are illustrated, it will be understood that other numbers of apertures are possible, such as 1, 2, 3, 5, 6, 7, 8, 9, 10, or more apertures in fluidic communication with a single well 216 of the well-plate layer 214.

As shown, the well-plate layer 214 defines of a number of wells. In this regard, the well-plate layer 214 includes, for example, a first well 216 in fluidic communication and in registry with a first trap 210 of the array of traps; and a second well 232 in registry and fluidic communication with a second trap 224 when the well-plate layer 214 is coupled to the fluidic layer 202. In the illustrated embodiment, the well-plate layer 214 defines 32 wells, each in fluidic communication and in registry with, for example, traps 210 and 224 of the array of traps when the fluidic layer 202 is coupled to the well-plate layer 214, it will be understood that other numbers and configurations of wells are possible and within the scope of the present disclosure, as discussed further herein with respect to the FIGS. 1A-1D.

In an embodiment, a fluidic resistance of a first portion of the channel 204 leading to a first trap 210 of the array of traps is approximately equal to a fluidic resistance of a second portion of the channel 204 leading a second trap 224 of the array of traps, such as when the first fluidic trap 210 and the second fluidic trap 224 are not occluded or otherwise occupied by a portion of tissue.

Systems

Figure 3:
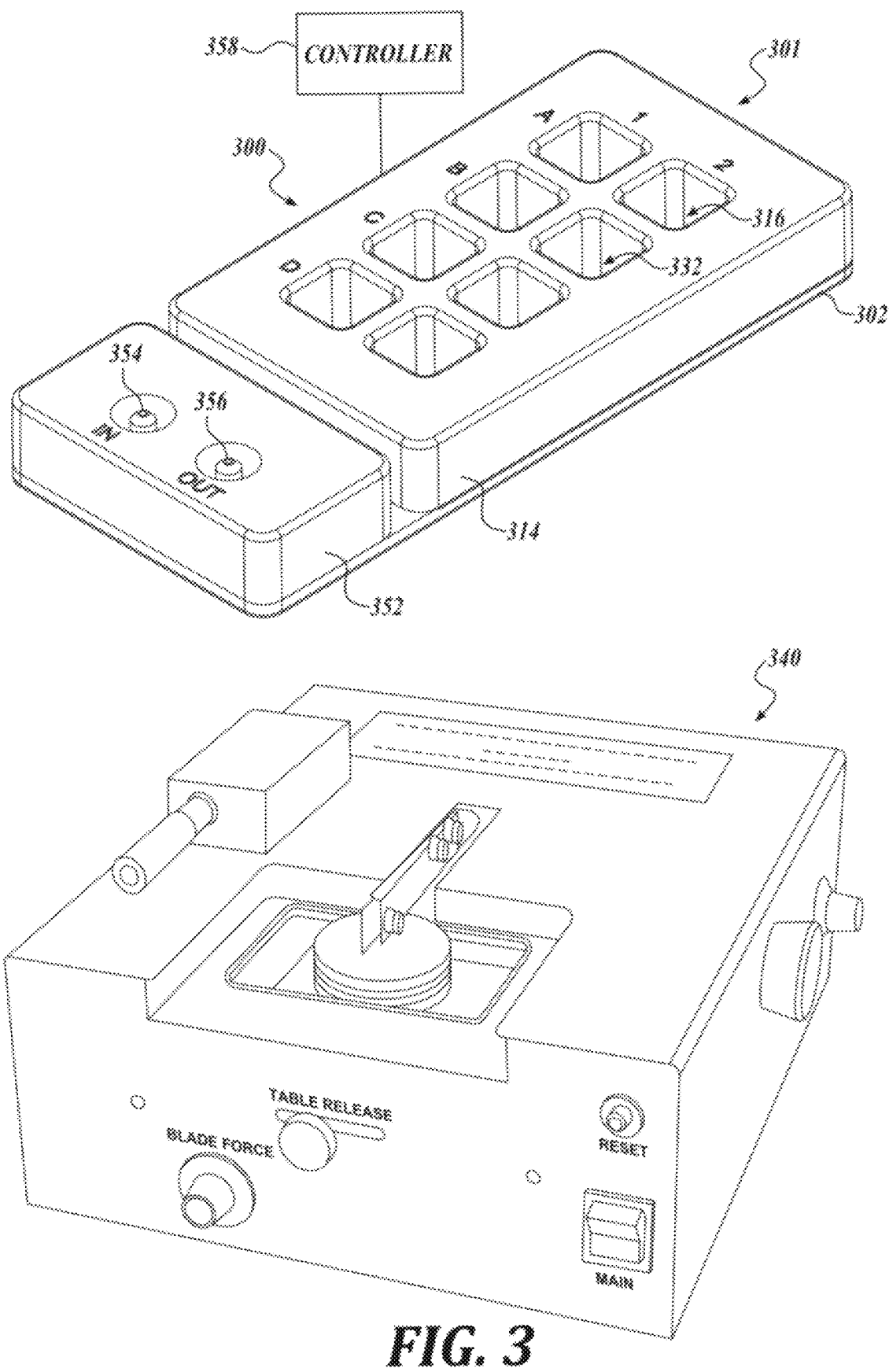
FIG. 3 is a perspective view of a system, according to an embodiment of the disclosure.
Figure 4A:
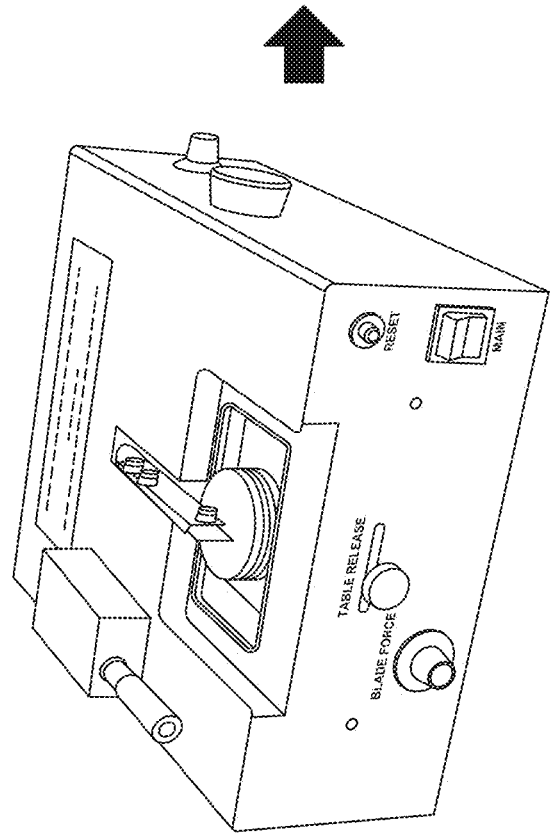
FIG. 4A is (left) an illustration of a cutting device, according to an embodiment of the disclosure and (right) an image of a tissue slice, according to an embodiment of the disclosure.
Figure 4A:
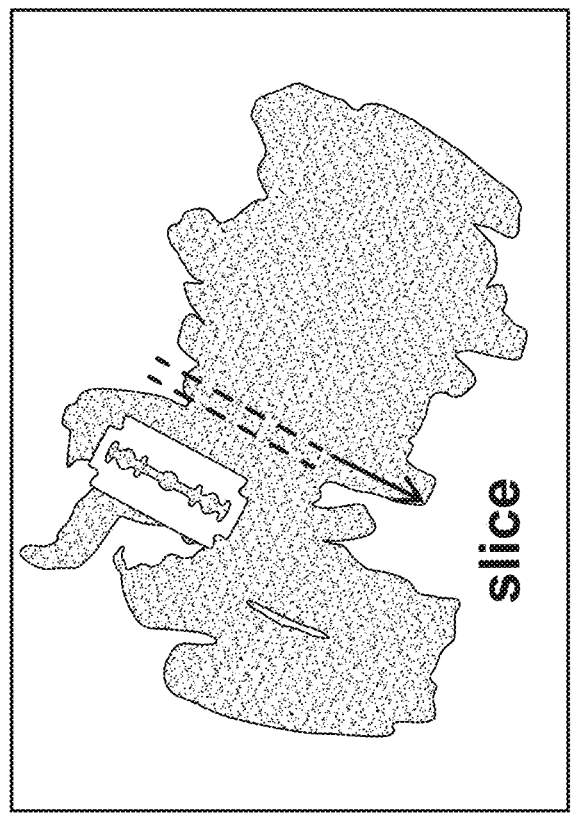
Figures 4B, 4C, 4D:
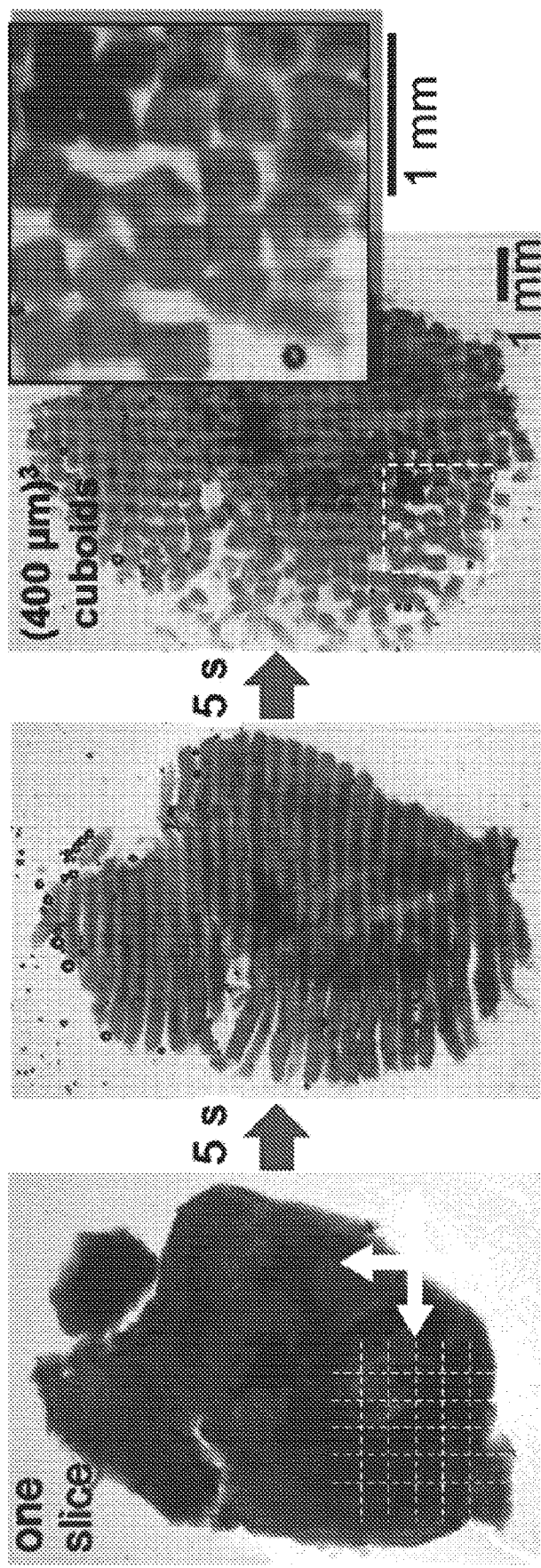
FIGS. 4B-4D are images of the tissue slice of FIG. 4A sequentially sectioned, according to an embodiment of the disclosure.

In another aspect, the present disclosure provides a system for trapping tissue samples and portions thereof. In this regard, attention is directed to FIG. 3 in which a system 301, in accordance with an embodiment of the disclosure, is illustrated. FIG. 3 is a perspective view of the system 301. In the illustrated embodiment, the system 301 includes a fluidic device 300 comprising an array of traps (not shown, see, for example, FIGS. 1A-1D); and a tissue cutting device 340 configured to cut a tissue sample into approximately regular portions shaped to fit within a trap of the array of traps.

In an embodiment, the fluidic device 300 is a fluidic device 300 according to any embodiments of the fluidic devices of the present disclosure. In an embodiment, the fluidic device 300 is a fluidic device 100 or a fluidic device 200 as discussed further herein with respect to FIGS. 1A-1D and FIGS. 2A-2E, respectively. As shown, the fluidic device 300 includes a fluidic layer 302, such as fluidic layer 102 of fluidic device 100. Fluidic device 300 is shown to further include a well-plate layer 314 defining wells 316 and 332 in registry with traps (not shown, see FIG. 1D) of fluidic layer 302. Fluidic device 300 is shown to also include input/output manifold 352 defining input aperture 354 and output aperture 356 in fluidic communication with a channel of the fluidic layer 302.

As above, the system 301 includes a tissue cutting device 340 configured to cut a tissue sample into approximately regular portions shaped to fit within a trap of the array of traps. In an embodiment, the tissue cutting device 340 is shaped to cut a tissue sample into substantially regular shapes, such as substantially regular cuboidal shapes. See, for example, FIG. 5A. In this regard, portions of the tissue sample cut and prepared by the tissue cutting device 340 are regularly and evenly shaped and, thereby, suitable to fit into regularly shaped traps of the fluidic device 300, such as is discussed further herein with respect to FIGS. 1A-1D.

In an embodiment, the tissue cutting device 340 is a McIlwain™ tissue chopper, suitable for preparing cuboidal portions of a tissue sample. While a McIlwain™ tissue chopper and cuboidal portions of a tissue sample are discussed herein, it will be understood that other tissue cutting devices or methods, suitable to prepare substantially regular portions of a tissue sample, such as portions of a tissue sample that are not cuboidal or substantially cuboidal, are within the scope of the present disclosure. In an embodiment the tissue cutting device 340 is suitable and configured to prepare portions of a tissue sample having shapes selected from pyramidal, spherical, discs, octahedral, and the like.

In an embodiment, the tissue cutting device 340 is configured to cut a tissue sample into portions, wherein the portions of the tissue sample are intact. As discussed further herein with respect to the EXAMPLES of the present disclosure, particularly, EXAMPLE 1, intact portions of the tissue sample, such as those trapped in traps of the fluidic device 300, are useful in testing or otherwise assaying compounds for manipulating the portions of the tissue sample, as the intact portions of the tissue sample retain characteristics of a whole, uncut tissue sample. Such characteristics of the intact portion of the tissue sample are useful in determining whether a compound will have particular effects on intact tissue, such as intact tissue inside a living body or otherwise in its native environment.

In an embodiment, the system 301 includes one or more filters suitable and configured for filtering portions of the tissue sample cut by the tissue cutting device 340. Not pictured, see FIG. 5A. As discussed further herein, such one or more filters are suitable for filtering bulk portions of a tissue sample to narrow a size distribution of the portions of the tissue sample.

In the illustrated embodiment, the system 301 includes a controller 358 operatively coupled to the fluidic device 300. In an embodiment, the controller 358 is configured to choreograph operation of the fluidic device 300 and, for example, additional peripheral components of the system 301, such as any fluid flow devices, illumination devices, and imaging devices. In an embodiment, the controller 358 includes logic that, when executed by the controller 358, causes the system 301 to perform operations. In an embodiment, the operations include flowing a fluid suspension comprising a tissue sample through a channel of the fluidic device 300, thereby trapping the tissue sample in the trap. In an embodiment, such flow is provided by a fluid flow device, such as a pump, in operative communication with the controller 358. In an embodiment, the operations include exposing the trapped tissue sample to compound by depositing the compound into the well. In an embodiment, the deposition is performed by a pipetting machine operatively coupled to the controller 358 and configured to automatically or robotically deposit one or more compounds into wells of the fluidic device 300. In an embodiment, the operations include illuminating the trap with light from a light source; and generating a signal with a photodetector based on light received from the trap. In an embodiment, the operations include flowing a suspension of an extracellular polymer matrix through the channel and around trapped portions of a tissue sample. In embodiment, operations include flowing a suspension of tissue portions into wells, such as into wells 216 and 232, or into the larger area defined by the input/output manifold 252 of fluidic device 200, thus trapping tissue portions of the suspension in the traps, as discussed further herein with respect to FIGS. 2A-2E.

Methods

In yet another aspect, the present disclosure provides a method of manipulating a tissue sample. In an embodiment, the method comprises contacting a fluidic device with a suspension of portions of tissue; and flowing fluid of the suspension through a channel of the fluidic device. In an embodiment, the method comprises flowing a fluid suspension comprising a tissue sample through the channel of a fluidic device, thereby trapping the tissue sample in a trap of the fluidic device; and exposing the trapped tissue sample to compound by depositing a solution comprising the compound into a well in registry and fluidic communication with the trap. In an embodiment, the method includes using microfluidic flow through channels to attract and immobilize tissue pieces into traps. In an embodiment, the method comprises placing a suspension of portions of tissue in fluid communication with wells of fluidic device; applying a vacuum source to a channel in fluid communication with the well, thereby trapping the portions of tissue in traps. In this regard, portions of tissue do not flow through the channel. In an embodiment, the method comprises using a fluidic device according to any embodiments of the fluidic devices of the present disclosure, such as fluidic devices 100 and 200 discussed further herein with respect to FIGS. 1A-1D and FIGS. 2A-2E. In an embodiment, the method includes cutting a tissue sample into portions of a tissue sample, such as with a tissue cutting device according to embodiment of a system of the present disclosure, such as tissue cutting device 340 discussed further herein with respect to FIG. 3.

The tissue sample can be any kind of tissue sample. In an embodiment, the tissue sample is a tissue sample of a tumor, such as from a tumor biopsy.

In an embodiment, the compound is a compound that manipulates or is thought to manipulate the tissue sample.

In an embodiment, the compound is a drug or drug candidate. In an embodiment, the solution further comprises a detectable agent, such as detectable agent selected from the group consisting of a dye, a nanoparticle, a fluorescent bead, and the like. In an embodiment, additional cell types are added into the channels or into the wells.

In an embodiment, the portions of the tissue sample are intact portions of a tissue sample. As described herein, an intact portion of a tissue sample has characteristics of a whole, uncut tissue sample and/or tissue in its native environment, such as within a body.

In an embodiment, the method includes cutting a tissue sample into pieces or portions, such as regular or substantially regular pieces of portions. In an embodiment, the method includes operating a tissue cutting device, such as a tissue cutting device discussed further herein with respect to the systems of the present disclosure, to provide portions of the tissue sample. In an embodiment, the portions of the tissue sample are shaped to fit into or be trapped by the array of traps. In an embodiment, the portions of tissue sample have a feature size of in a range of about 50 µm to about 800 µm, 200 µm to about 600 µm, 75 µm to about 600 µm, 100 µm to about 500 µm, 100 µm to about 250 µm, or 50 µm to about 150 µm.

In an embodiment, the method includes filtering a suspension of the portions of tissue, to provide a filtered suspension of the portions of tissue having a narrower size distribution than the suspension of the portions of tissue.

In an embodiment, the method includes flowing an extracellular matrix polymer through the channel, such as after the portions of tissue are disposed in traps of the array of traps. In an embodiment, the extracellular matrix polymer is collagen.

In an embodiment, the method includes flowing a compound that manipulates or is thought to manipulate a trapped portion of a tissue sample through the channel, thereby contacting the trapped portion of a tissue sample with the compound.

In an embodiment the method includes contacting a gas-permeable layer of the fluidic device, such as a gas-permeable floor layer of the device with a compound that manipulates or is thought to manipulate a trapped portion of a tissue sample, thereby contacting the trapped portion of a tissue sample through the gas-permeable floor.

EXAMPLES

Example 1: Tissue Processing, Culturing, and Imaging

Cell Culture and Drug Screening

U-87 MG (U87) cells (ATCC) were grown in DMEM/F12 (Invitrogen) supplemented with 10% fetal bovine serum (VWR) and penicillin/streptomycin (Invitrogen). We passaged the cells twice a week.

Mouse Tumor Models

Mice were handled in accordance with protocols approved by the University of Washington Animal Care and Use Committee. To generate xenograft tumor mice, male athymic nude mice (Taconic, Foxn1$^{nu}$) aged 4-10 weeks were injected subcutaneously in the flank (0.5-1 million cells in 200 µL of DMEM-F12 serum and antibiotic-free medium). Mice were sacrificed before tumor volume reached 2 cm$^2$ (2-4 weeks). Livers from male nude mice without tumors (2-4 months old) were used for the cuboid culture. For the chopping quantitation experiments, we used livers from adult (3 months old) C57BL6-derived mice (C57BL6-Sntb1$^{tm2fl/fl\ SCF}$, functionally wild-type) that were kindly provided by M. Adams and S. Froehner, University of Washington.

Microdissection Procedure and Cuboid Culture

To microdissect tissue cuboids, we used a standard McIlwain tissue chopper (Ted Pella, Inc.) set to 400 µm slice thickness. We first cut 400 µm-thick slices by mounting ~1 cm×1 cm tissue samples (mouse liver or glioma) onto a ¼" PMMA disc using cyanoacrylate glue (Krazy glue). This procedure resulted in ~20-25 tissue slices, which we manually separated as needed.

Then, we manually transferred the slices into ice cold solution in a dish using a razor blade. When possible, we kept the live tissue in ice-cold solutions (DMEM/F12 supplemented with HEPES), with mouse liver and slices for culture initially in Belzer UW Cold Storage Solution (Bridge to Life). Note that the blade leaves indentations in the PMMA surface with each cut. After leveling the blade again to ensure maximum contact, we cut the slices into cuboids as follows. We placed 400 µm-thick slices onto a relatively smooth (unused or used only once prior) ¼ " PMMA disc and removed excess fluid to prevent movement. After the first series of cuts, we rotated the disc 90° and repeated the cutting procedure. After cutting, we transferred the cuboids to a dish. To separate the cuboids, we gently pipetted up and down and used other tools if necessary (i.e. dissecting scissors). Then, we filtered the cuboid solution through a 750 µm filter followed by a 300 µm filter (Pluriselect, USA), keeping the cuboids retained by the smaller filter. Cuboids were maintained and washed with DMEM-F12 with HEPES. Before loading into devices, we manually removed unwanted particles (i.e. excess glue, unwanted pieces). For experiments with liver cuboids in culture, we did the first cut of the liver into 400 µm-thick slices using a 5100 mz vibratome (Lafayette Instrument) in ice cold Krebs-Henseleit solution (Alfa Aesar), bubbled with carbogen (95% $O_2$, 5% $CO_2$).

U87 cuboids were cultured in collagen hydrogel. We prepared 80% collagen (Corning rat tail collagen type 1, 354236, 3-4 mg/mL), 10% 10×PBS, and 10% serum-free medium. We then used filtered-sterilized 1M NaOH to neutralize the pH to ~7.2. For culture in 6 well plates, cuboids were cultured in 1 mL collagen on top of a 0.4 µm filter Transwell PFTE membrane insert (PICMORG50, Millipore) with 1.3 mL culture medium placed below. Cuboids were cultured both with and without an additional layer of pre-gelled 1 mL collagen below with similar histology and staining observed, apart from a relatively flatter shape often seen without the extra collagen layer. The culture medium contained Neurobas al-A medium (Invitrogen) with 25% heat-inactivated horse serum (Sigma), Glutamax (Invitrogen), 2× penicillin/streptomycin (Invitrogen), and growth factors (EGF 20 ng/mL and FGF 20 ng/mL, Preprotech or Invitrogen). Cisplatin (3 mM stock in $dH_2O$, MedChem Express) was diluted in cell culture medium for the drug treatment experiment. Liver cuboids were cultured in 1 mL of collagen hydrogel on a Millipore insert with constant shaking. Culture medium was William's Medium (with L-glutamine, Invitrogen, Scotland) supplemented with 25 mM glucose (Sigma-Aldrich, USA), 30 nM insulin (ITS+ premix, Zen-Bio, Inc., USA), 1 nM EGF (Preprotech), 5% Pen Strep (Sigma-Aldrich, USA), 100 nM glucagon (Sigma-Aldrich, USA).

We have focused on cuboids that measure ~400 µm×400 µm×400 µm because this size strikes the balance between a larger size that better preserves the TME, and a smaller size that better maintains nutrient delivery and viability, thus minimizing the development of necrotic cores. Previous studies have used organoids between 300-800 µm from a variety of solid tumor types with success. Larger and smaller cuboids are possible and could also be of interest, e.g. to understand the effect of hypoxia (larger cuboids) and to obtain higher throughputs (smaller cuboids). A small tumor from which 4 or more 1 cm-diam. slices could be obtained on the first cut theoretically could yield up to a few thousand cuboids that are (400 µm)3 in volume. In practice, the debris caused by the dissection procedure and other irregularities make a filtering step highly desirable. Passage through mesh filters of defined dimensions can enable enrichment for pieces of a particular size range, because it removes pieces that are too big (e.g. remain attached to each other) or too small (e.g. cut from the edges or from pieces that break up during processing).

TABLE 1

| Total number of cuboids per unit area | | | | |
| --- | --- | --- | --- | --- |
| Cuboid size | $(200\ \mu m)^3$ | $(300\ \mu m)^3$ | $(400\ \mu m)^3$ | $(500\ \mu m)^3$ |
| # cuboids/$cm^2$ | 2,500 | 1,111 | 625 | 400 |

Cuboid Size and Sample Yield Analyses

During microdissection, each set of slices cut at once (400 µm-thick, 11-17 slices, ~100 $mm^2$) represented one set of cuboids. After dissecting each set of slices (as described above), we isolated the resulting cuboids in a 6-well plate. We took tiled 2× images of each set of cuboids before and after filtering.

We utilized the free Fiji image analysis program to investigate cuboid size distribution and sample yield for both mouse liver and glioma intact tissues. First, we converted each image to an 8-bit binary format. After binary conversion, we did background subtraction (100-200 pixel rolling ball radius) and manually adjusted brightness and contrast, if necessary. In addition to background subtraction, bubbles and other imperfections (such as objects out of focus) were eliminated from the images utilizing a background-colored brush. After cleaning, we adjusted the threshold to isolate the tissues (cuboids and slices, black) from the background.

To isolate cuboid aggregations, we converted binary images to masks and performed a watershed (1 px line width). Each image was carefully inspected to ensure proper watershed. By comparing to the original image, we were able to distinguish areas of imperfections and did manual corrections as necessary. We adjusted the scale (µm/px) of each image and analyzed the area ($\mu m^2$) of cuboids/slices, by setting a size range of $(100\ \mu m)^2$-$(650\ \mu m)^2$ and >$(300\ \mu m)^2$, respectively.

To estimate the dimensions of each cuboid, we assumed that cuboids had a cuboidal shape and took the square root of the obtained area value. We utilized GraphPad Prism 8 to investigate the size distribution (relative frequency) of each cuboid set using a 100-650 µm bin range with a 50 µm bin width. Similarly, for cumulative size range distribution analyses, we utilized a 100-750 µm bin range with a 300 µm bin width and averaged the relative frequency for all data sets (n=6, for both mouse liver and glioma).

To estimate the % of original sample left after dissection and filtering, we computed the total area of each slice set. Then, we aggregated the total cuboid tissue area for each set before and after the filtering step and the total area of cuboids within the range of 300-600 µm. Finally, we divided each data set by the total slice area. The same process was performed for both mouse liver and glioma tissues.

Figure 5A:
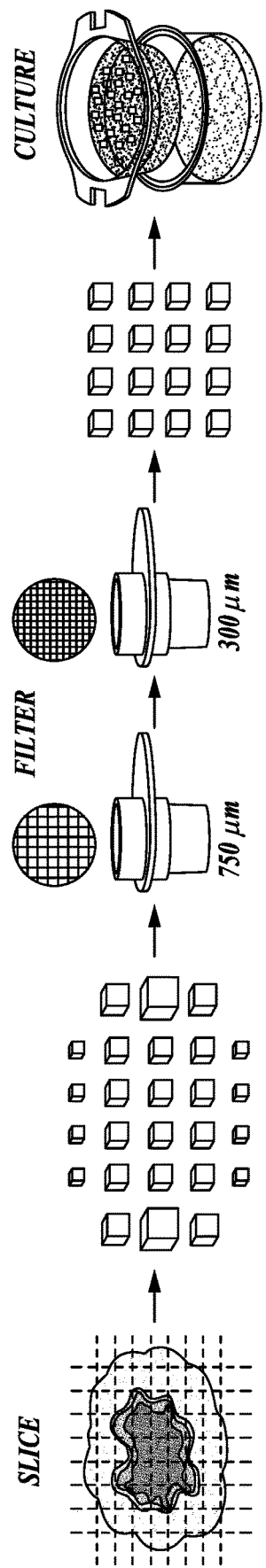
FIG. 5A schematically illustrates cutting, filtering, and culturing a tissue sample, according to an embodiment of the disclosure.
Figure 5C:
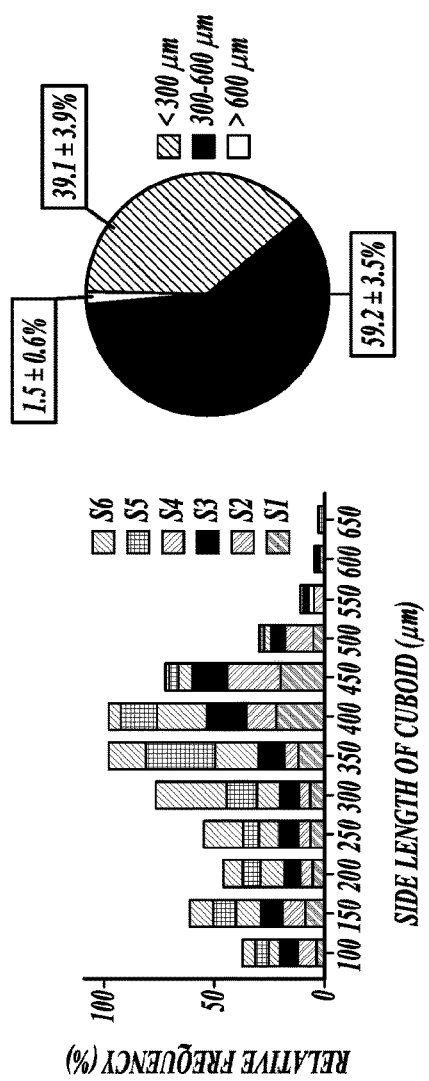
FIG. 5C graphically illustrates relative size frequency compared to side length of portioned tissue samples of FIG. 5A, in accordance with an embodiment of the disclosure.
Figure 5E:
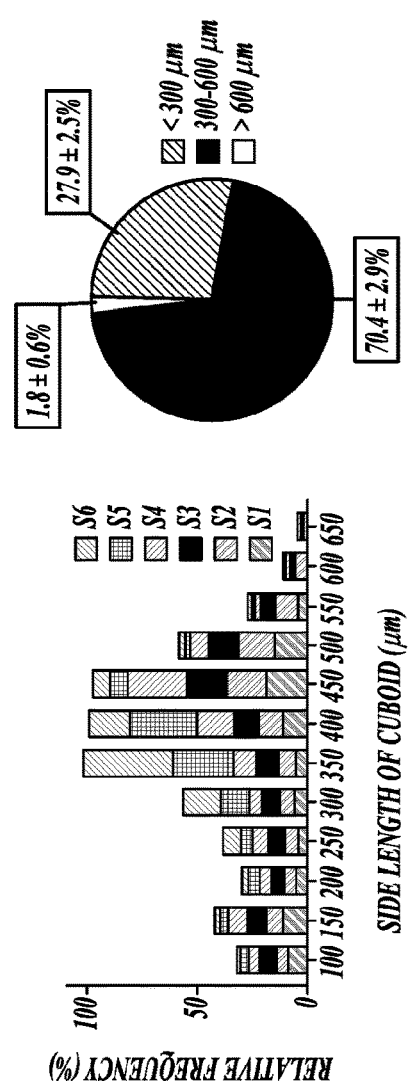
FIG. 5E graphically illustrates relative size frequency compared to side length of portioned tissue samples of FIG. 5D, in accordance with an embodiment of the disclosure.
Figure 5B:
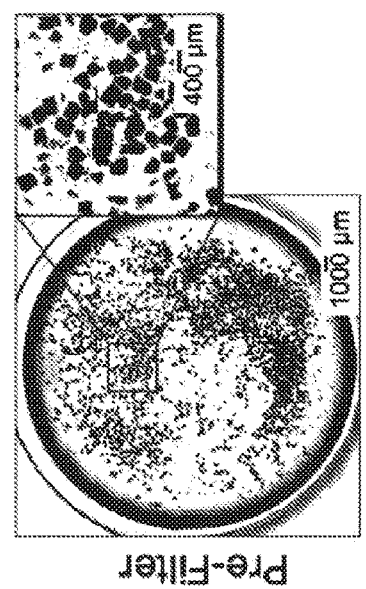
FIG. 5B is an image of sliced tissue portions, according to an embodiment of the disclosure.
Figure 5D:
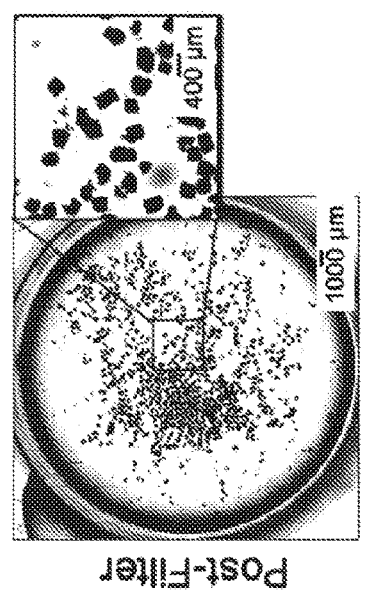
FIG. 5D is an image of the sliced tissue portions of FIG. 5B after filtration, in accordance with an embodiment of the disclosure.

We evaluated the size distribution and sample loss for the cutting and filtering/enrichment steps of our cuboid microdissection process (FIG. 5A). We analyzed freshly microdissected cuboids before and after filtering both from mouse liver (FIGS. 5B-5E) and from U-87MG (U87) glioma cell-derived xenograft flank tumors (FIGS. 5F-5I). The liver and glioma tissues yielded different size distributions, probably due to the differences in consistency and density between liver and glioma. For mouse liver samples before filtering, we observed large numbers of liver tissue fragments below the desired size range (39% of the cuboids<300 µm), though the majority of cuboids were in the desired size range (59% were 300-600 µm) (FIGS. 5B and 5C). The filtering steps improved the size distribution, reducing the small liver cuboids and fragments to ~28%, and increasing cuboids of the desired sizes to 70% (FIGS. 5D and 5E). We only observed a small percentage of liver cuboids bigger than 600 µm, both before filtering (1.5%) and after filtering (1.8%). For glioma cuboids before filtering (FIGS. 5F and 5G), we observed a smaller percentage of small pieces (20% were smaller than 300 µm and 78% were in the desired size range) than we had with liver, suggesting less tissue fragmentation during the microdissection process. As with the liver, the filtering steps improved the size distribution, with 88% of the glioma cuboids in the desired 300-600 µm size range and only 10% of the cuboids smaller than 300 µm. As with liver cuboids, only a small percentage of glioma cuboids were larger than 600 µm, both before (0.9%) and after (1.3%) filtering.

In addition to size distribution, we investigated how much of the initial liver and glioma tissue sample loss occurs in each microdissection step of the process. We found that, at the end, cuboids of the desired 300-600 µm size range represented ~34% and ~48% of the initial liver and glioma tissue slice samples, respectively. The tissue loss due to mechanical microdissection was similar for both liver (~20%) and glioma (~21%). Likewise, tissue loss due to the filtering steps was similar for liver (~32%) and for glioma (~25%). Together, the tissue loss from the dissection and filtering steps totaled ~53% for liver and 46% for glioma. Finally, to better understand the effectiveness of the filtering process for our cuboid size of interest, we calculated the loss of the initial pool of 300-600 µm cuboids with filtration, which was higher for liver (~49%) than for glioma (~30%), perhaps due to the fragility of the liver cuboids. We could potentially improve our microdissection process. An additional 300 µm filtering step to remove more of the smallest cuboids would increase the percentage of cuboids of the desired size range, but at the cost of a lower yield. We found that much of the sample loss, and some of the cuboids measured as larger than 600 µm, resulted from incomplete separation of cut cuboids. This problem could potentially be addressed by gentle enzymatic treatments such as collagenase or DNase.

Cuboids that are too small or too large impair the performance of our microfluidic device, which has flow-driven cuboid traps. While the smallest tissue fragments just flow straight through the device, tissue fragments between 100-150 µm can directly obstruct and/or clog the small microchannels, thus disabling individual traps. Cuboids between 150-250 µm would potentially allow trapping of multiple cuboids because they are not big enough to fill the traps. On the other hand, cuboids larger than 600 µm that may have difficulty flowing through the bypass channel curves, could result in cuboid congestion or even blockage.

Live Staining and Microscopy

Live U87 glioma cuboids were stained for 1 hour, 37° C., with the following dyes (individually or in combination) diluted in culture medium: Cell Tracker Green CMFDA (Invitrogen, 10 µM), Cell Tracker Orange CMRA (Invitrogen, 10 µM), Hoechst (H; Invitrogen, 16 µM), and/or SYTOX green (SG; Invitrogen, 0.01 µM). We performed epifluorescence and brightfield microscopy of the cuboids with a Nikon Eclipse Ti inverted microscope (Nikon Instruments, Melville, N.Y.) at 2× and/or 4×. For SG analysis, we used FIJI as follows. We performed background subtraction from empty areas. Cuboid regions were created from the Hoechst channels by thresholding, Watershed on a binary image, followed by Analyze Particles. Mean SG fluorescence was normalized to the average value of untreated cuboids.

Immunostaining

Off-device cuboids were fixed with 4% paraformaldehyde overnight then cryoprotected with 30% sucrose/PBS overnight two times. Cryosections (14 µm thickness) were then processed for H&E or for immunostaining. For immunostaining, we pretreated tissue sections with 0.6% hydrogen peroxide in methanol for 30 min, washed, and then for some antibodies (processed for antigen retrieval (by steaming for 30 min in 10 mM sodium citrate, 0.05% Tween 20 (Sigma), pH 6.0. After at least 30-min incubation in blocking solution (Tris-NaCl-blocking buffer or TNB buffer, Perkin Elmer, with 0.1% Triton X-100), we incubated the tissues with rabbit primary antibodies (diluted in TNB) overnight at 4° C.: active cleaved caspase 3 (CC3, 1/600, Cell Signaling), Ki-67 (1/1,000, AbCAM, ab15580), CD31 (1/200, AbCAM ab28364), or CD45 (1/1,000, AbCAM, ab10558). Finally, we incubated the tissues with peroxidase polymers of the appropriate species for 30 min (rabbit from Vector Labs MP7401 or mouse from Biocare MM510) then with the chromogen 3,3'-Diaminobenzidine (DAB, Vector Labs) and lightly counterstained with hematoxylin. We performed all tissue washes with PBS.

Figure 6A:
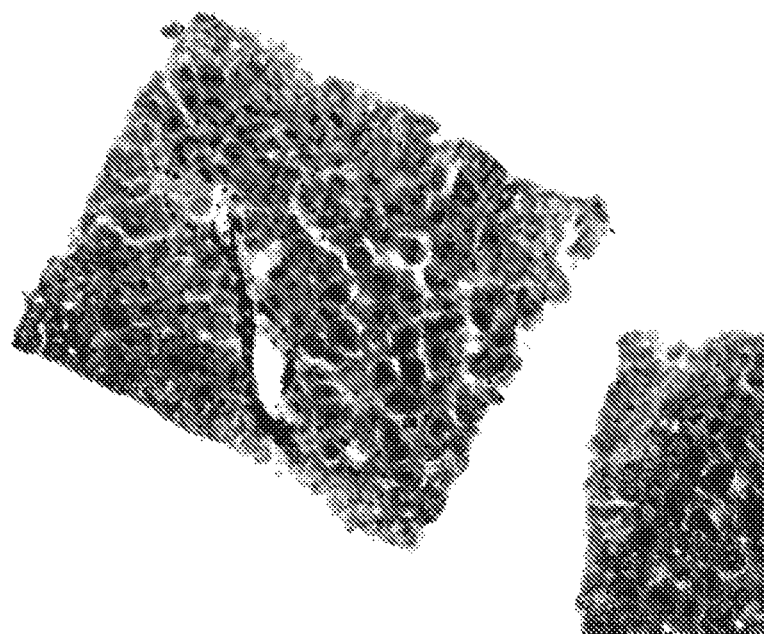
FIGS. 6A and 6B are images of hematoxylin and eosin staining from liver cuboids after 3 days in culture, demonstrating that the cutting technique and culture preserves the tissue microstructure, in accordance with an embodiment of the disclosure.
Figure 6B:
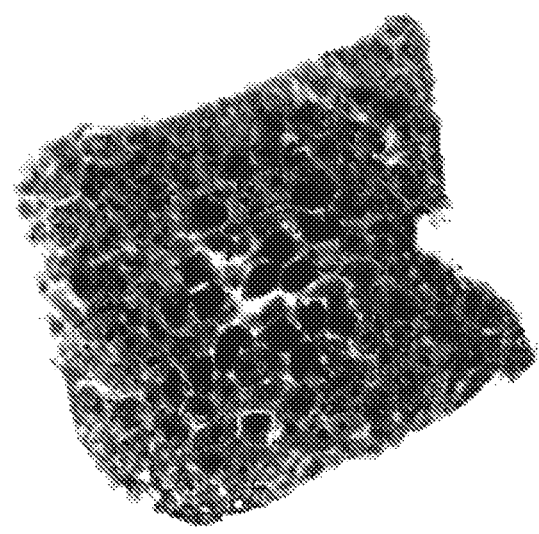

To evaluate the liver cuboids in culture, we examined their histology after 3 days in culture within a collagen hydrogel layer. Analysis of H&E staining revealed that while the outer edge of the cuboid had ~1-3 layers of dead cells (not unexpected from the cutting procedure on the fragile liver), much of the cuboid interior appears preserved, with a central necrotic region (FIGS. 6A and 6B). The large hepatocytes (parenchymal cells), nuclei of smaller non-parenchymal cells (which include Kupffer cells, stellate cells, and endothelial cells, among others), along with the liver sinusoids and other vascular structures, can all be observed (FIGS. 6A and 6B).

To evaluate U87 glioma cuboids in culture, we assessed the viability and microenvironment of cuboids after two days in culture using fluorescent viability stains of live cuboids and immunostaining of histological sections. For these experiments, we cultured the cuboids within a collagen hydrogel layer on top of a Transwell insert, with an air interface above and medium below for micro-dissected tumor pieces. By day 2, the cuboid shape relaxed to that of a spheroid.

Figure 6C:
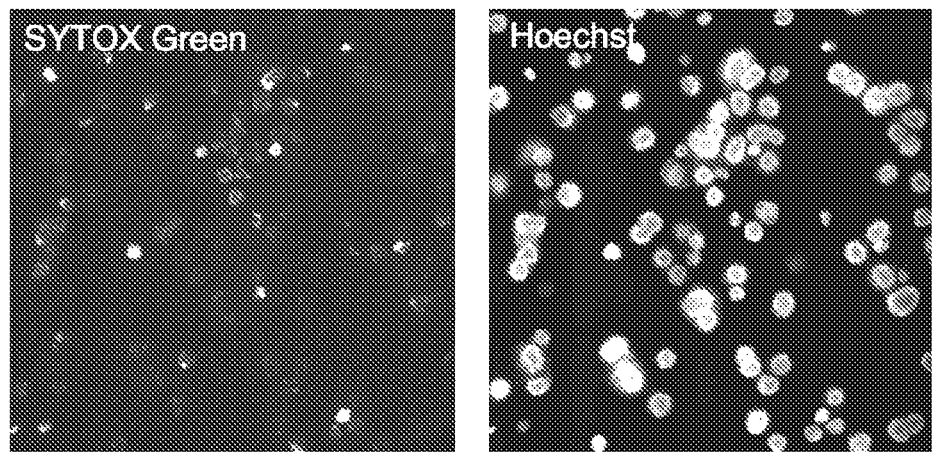
FIG. 6C is an image of viability staining of live U87 glioma cuboids after 3 days in culture with a dead nuclei stain with SYTOX green (SG, green) and all nuclei stain with Hoechst (blue), in accordance with an embodiment of the disclosure.
Figure 6D:
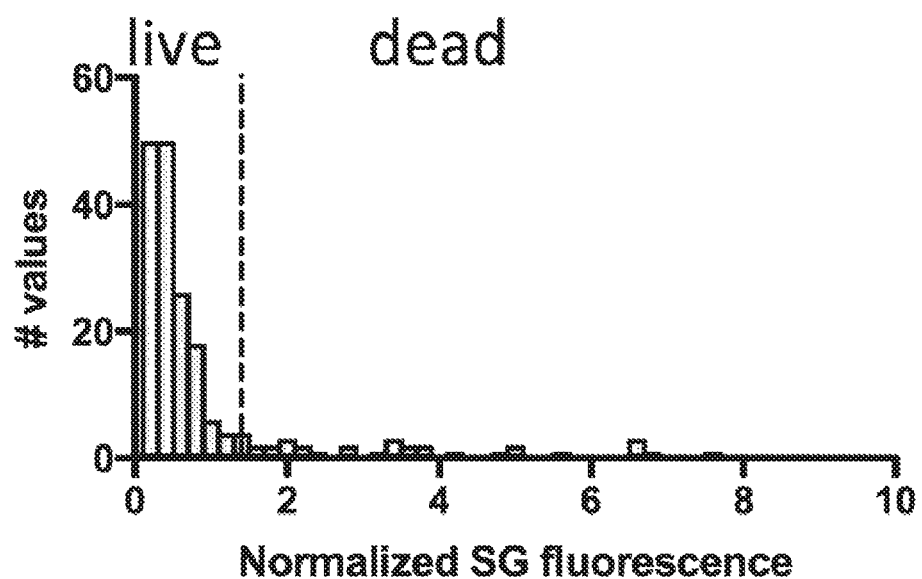
FIG. 6D is a histogram of mean SG fluorescence after normalization to average (N=188), wherein the dotted line indicates fluorescence threshold of 1.4, in accordance with an embodiment of the disclosure.
Figure 6E:
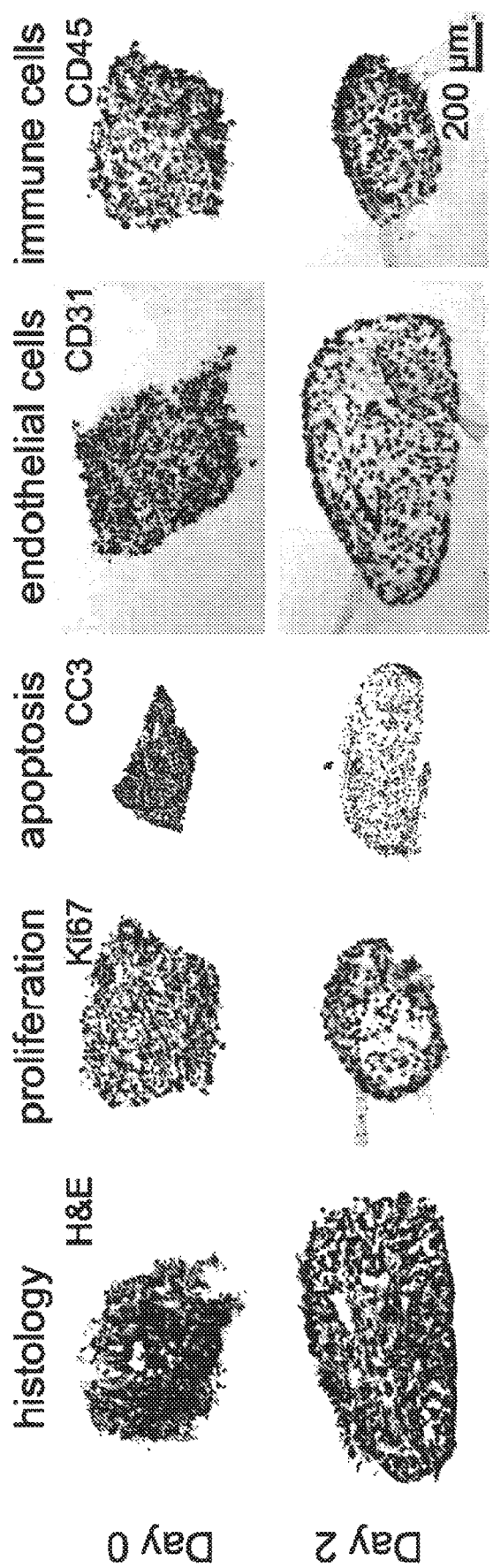
FIG. 6E includes images of U87 glioma cuboids before (day 0) and after time in culture in collagen hydrogel (day 2), showing histology and immunostaining for proliferation, apoptosis (cleaved-caspase 3, CC3), endothelial cells, and immune cells, in accordance with an embodiment of the disclosure.

First, we performed live viability staining of the U87 cuboids using the green fluorescent dead nuclear stain, SYTOX green (SG), and the blue fluorescent pan-nuclear stain, Hoechst (H) after 3 days in culture (FIG. 6C). Most of the cuboids show minimal SG dead stain (fluorescence normalized to the mean), but ~15% were relatively green (dead) (two separate experiments with ~16% at day 3 and at day 4) (FIG. 6D). The threshold for death was the mean increase (1.4) seen after a 2-day maximal drug treatment (100 µM Cisplatin). Next, after fixation, staining of thin sections also revealed preservation of the cuboid viability (FIG. 6E). Hematoxylin and eosin (H&E) staining showed similar histology to the initial tumor Immunostaining revealed continued proliferation (Ki-67), minimal apoptosis (anti-cleaved caspase 3, CC3) usually central if present. Finally, immunostaining for different cells of the microenvironment demonstrated continued presence of endothelial cells (CD31) and of immune cells (CD45) (FIG. 6E). These results support the potential of cuboids as an intact tissue model for drug testing.

Example 2: Example Device Design and Operation

Figure 7A:
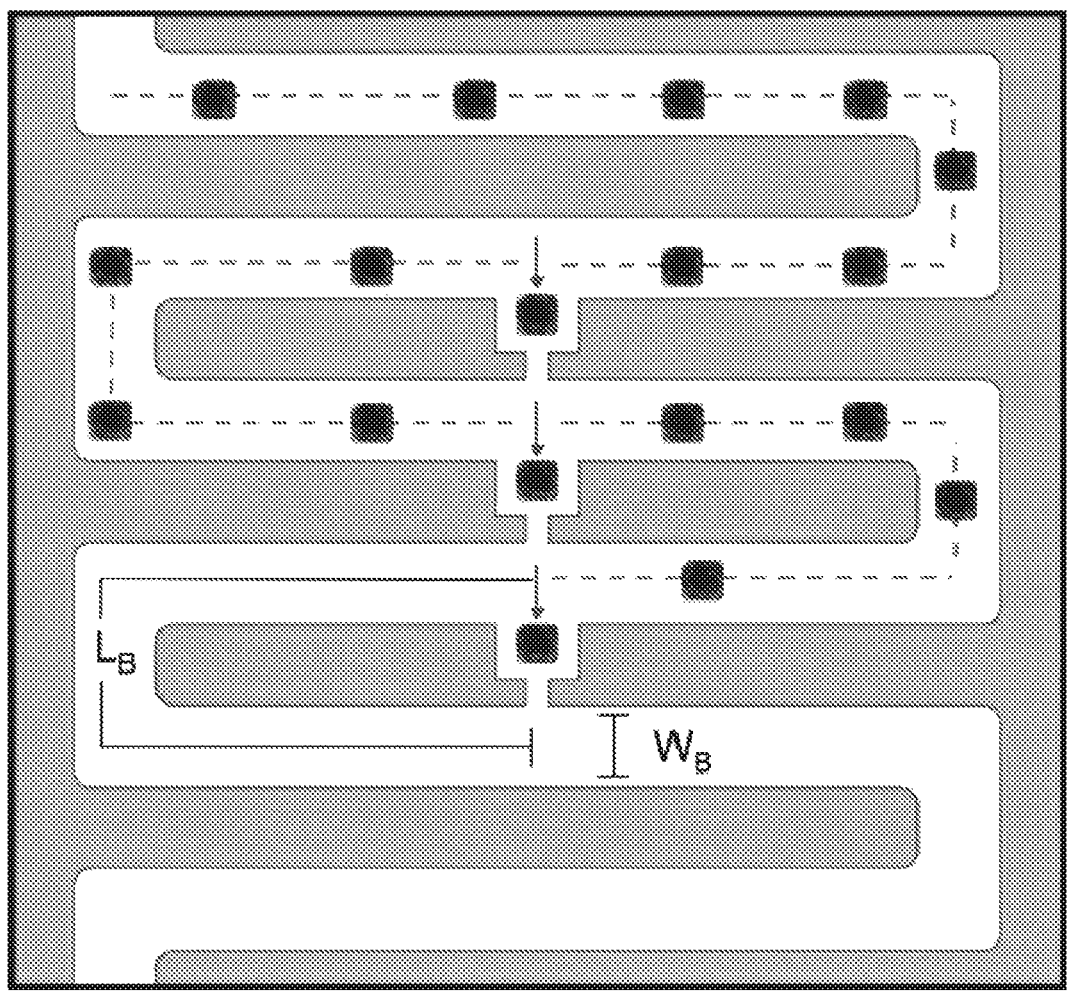
FIG. 7A is a top-down plan view of a device, in accordance with an embodiment of the disclosure, showing cells travelling through a channel of the device.
Figure 7B:
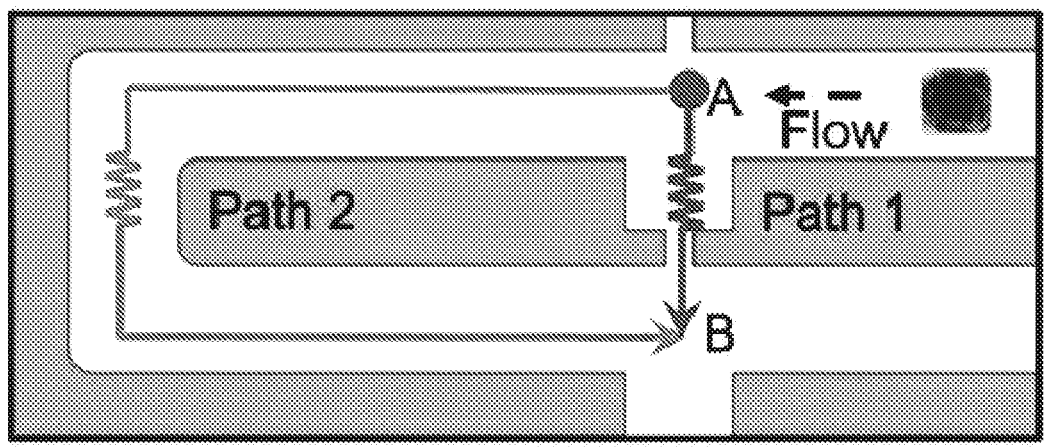
FIG. 7B is top-down plan view of a portion of the device of FIG. 7A showing fluidic resistances of portions of the device, in accordance with an embodiment of the disclosure.
Figure 7C:
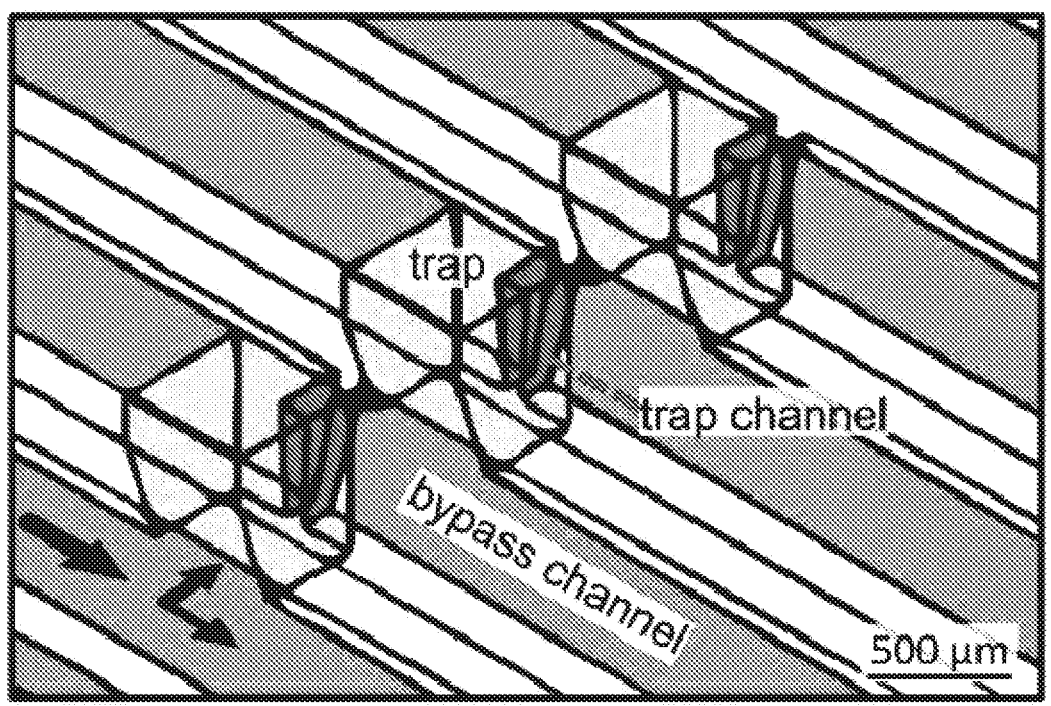
FIG. 7C is a perspective view of the device of FIG. 7A showing traps, in accordance with an embodiment of the disclosure.

The regular, small size of the cuboids makes them amenable to microfluidic hydrodynamic trapping. To trap the cuboids, we chose a design configured to trap nearly every particle entering the network until all of the traps are filled (FIGS. 7A and 7B). Flow diverts particles from the main channel into individual trap channels when they are empty and not when they are filled. Later versions by others, all made in PDMS, trapped cells or spheroids of less than 200 µm diameter. To iterate the design of our first prototypes and to rapidly test various trap and chip layouts, we used stereolithographic 3D-Printing until we settled on our final trap and chip design. To avoid resin leaching issues and to facilitate the integration of removable layers (which are needed for hydrodynamic seeding of the cuboids), we fabricated the final design in PMMA laminates, following our published laser cutting and PMMA bonding protocols. A 3D CAD drawing (FIG. 7C) shows the basic design of the PMMA microfluidic channel network and traps.

Figure 8A:
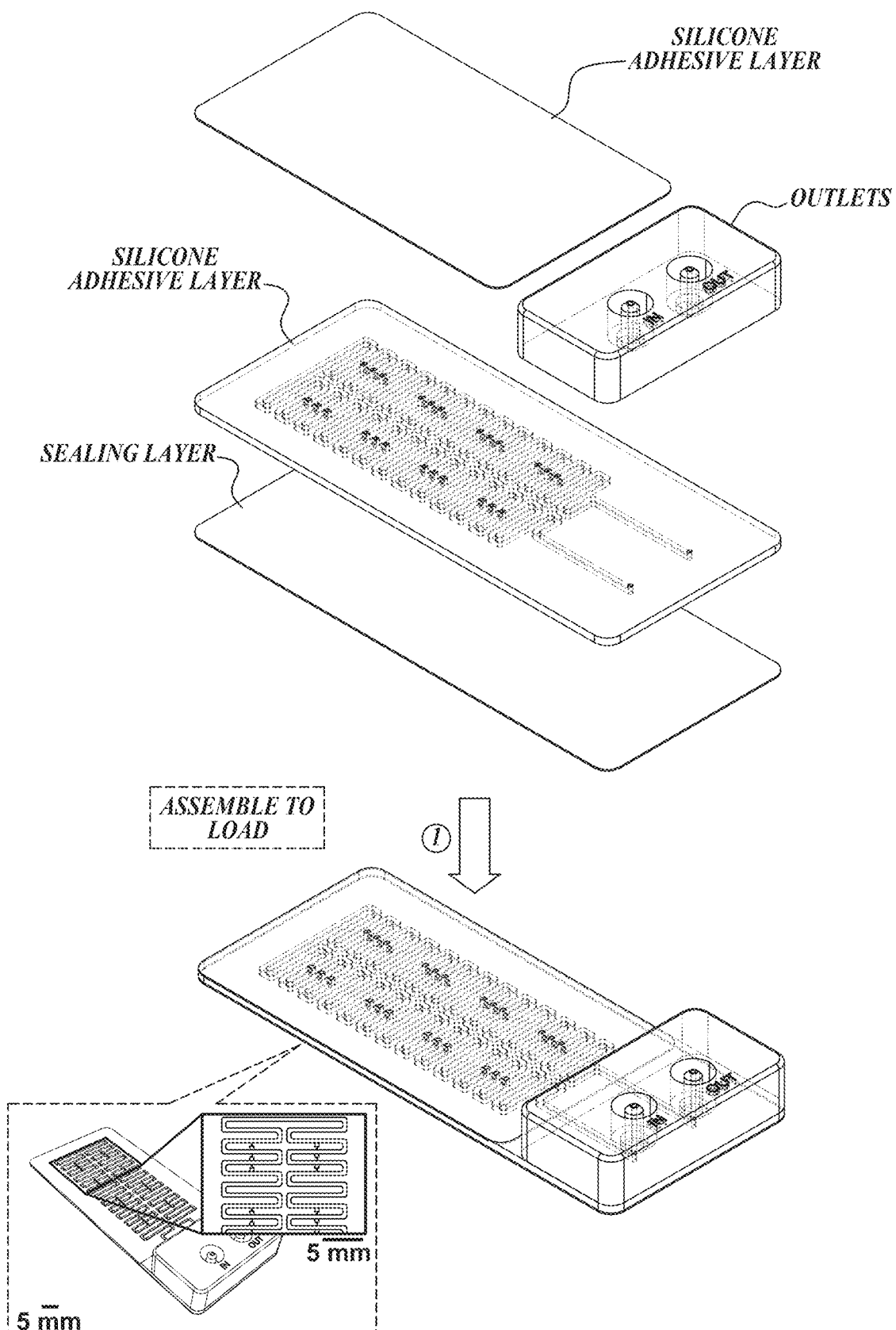
FIG. 8A schematically illustrates use of a device, in accordance with an embodiment of the disclosure with inset images of the device ready for loading and of the device ready for culture.
Figure 8A:
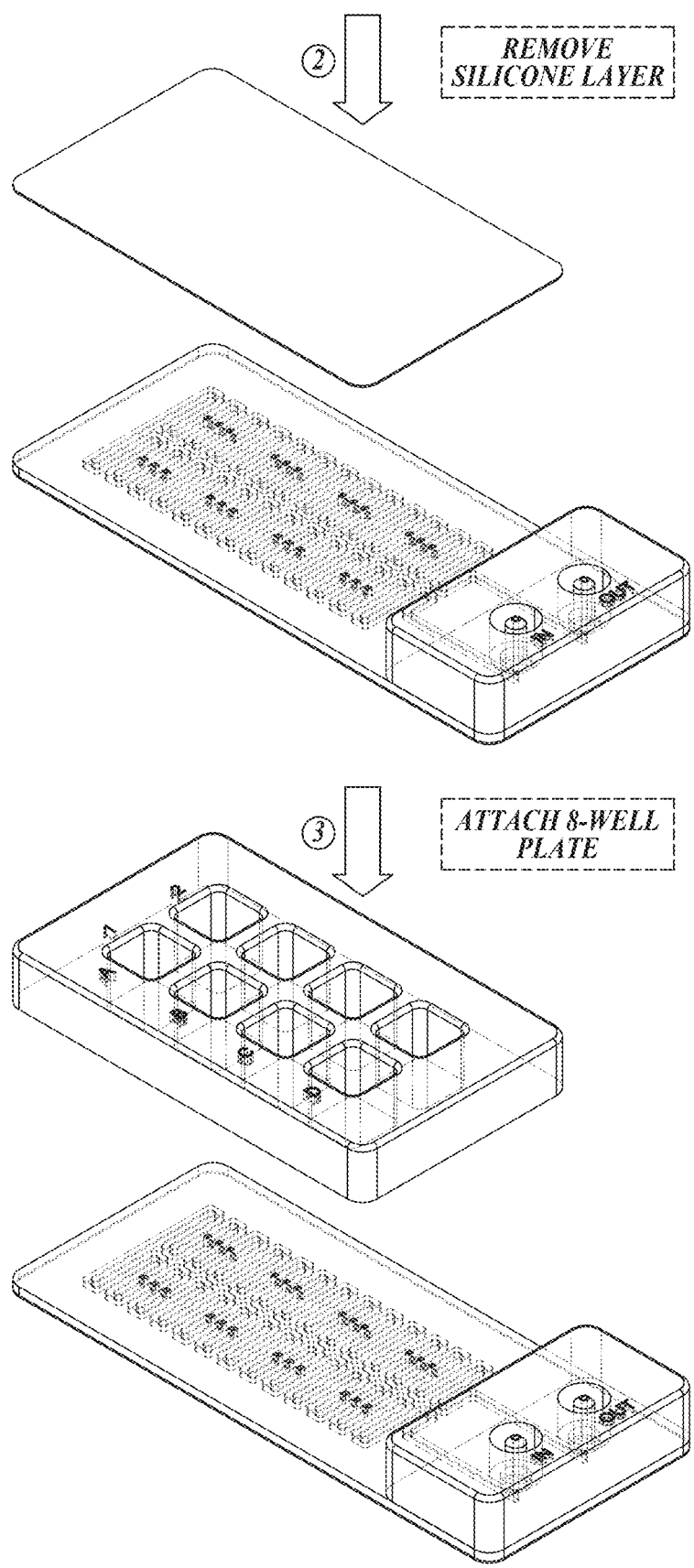
Figure 8A:
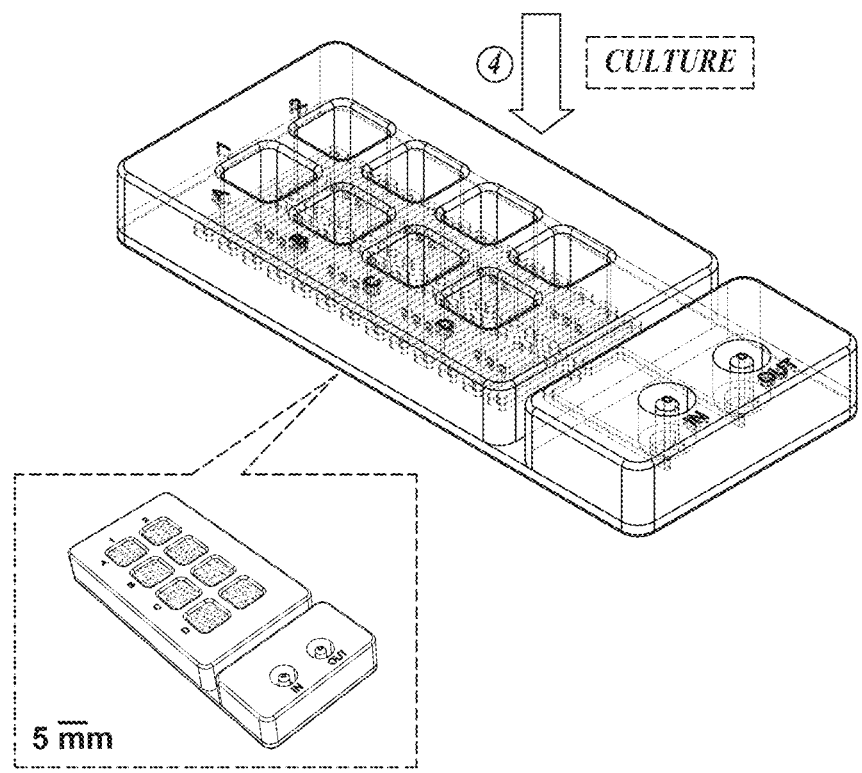
Figure 8B:
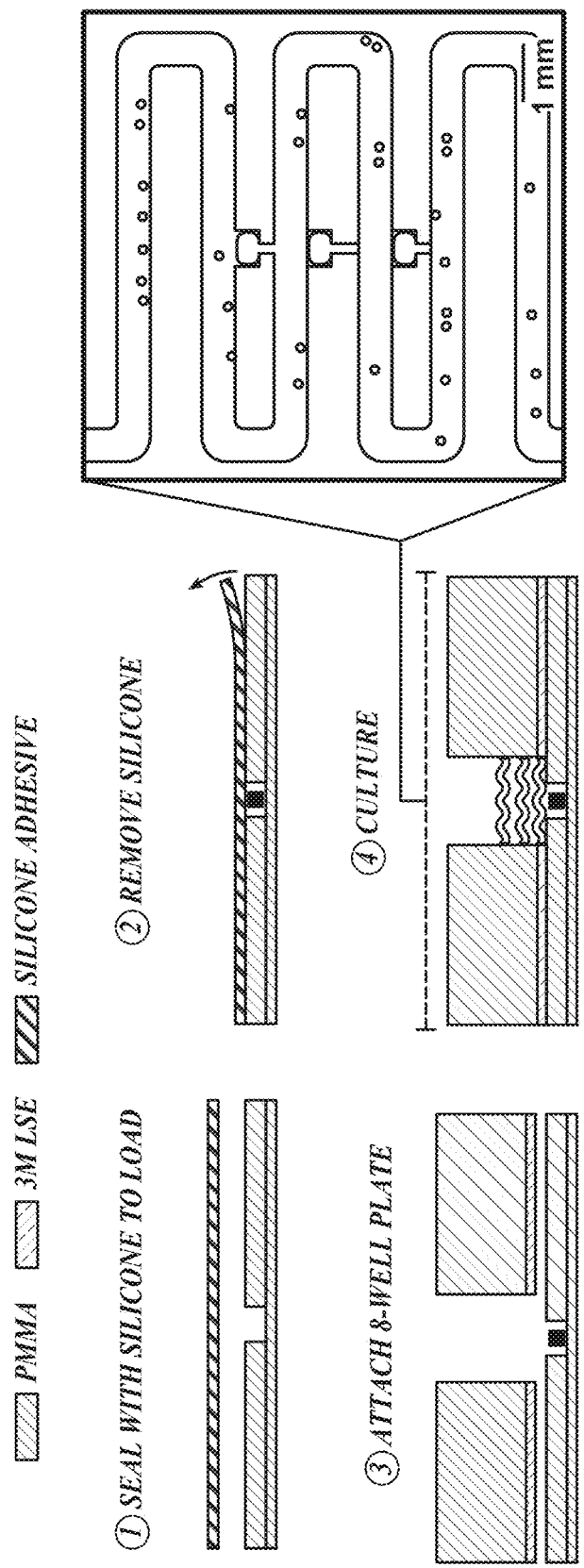
FIG. 8B is a cross-sectional view of the device and use of device illustrated in FIG. 8A with an inset showing a top view of trapped glioma cuboids (fluorescently labeled with CellTracker-Orange) in a single well of the microfluidic device, in accordance with an embodiment of the disclosure.

Our microfluidic device enables the trapping of intact cuboidal micro-tissues into addressable wells/traps for culture and multi-drug exposures (including cell-based therapies). The multi-stage design consists of a loading stage and a culture stage (FIG. 8A). For both stages of operation, the device is composed of 4 functional components, not including the lid and a base for culture. These components are: 1) a removable polysil silicone adhesive roof (for the loading stage) or a bottomless 8-well plate (for the culture stage, attached after loading), 2) a microfluidic channel layer, 3) a sealing layer for the bottom surface of the channel network, and 4) a set of inlets.

We fabricated the device using a combination of $CO_2$ laser micromachining, thermal fusion bonding and transfer adhesive techniques. For $CO_2$ laser micromachining, we determined different optimal $CO_2$ laser power and speeds for each specific width and depth of the cuboid traps and microchannels. Chloroform treatment before bonding not only promoted thermal fusion bonding of the PMMA components, but also improved the optical clarity and reduced surface roughness. The irreversible bonding procedure for the PMMA components (with the exception of the silicone adhesive) produced a leak-proof platform.

The microfluidic device design comprises two stages of operation. A main microchannel connects the 8 wells in series. In the final culture configuration, each well contains 3 cuboid traps that each open from the top to the well and remain connected to the main microchannel. Due to this incompletely closed channel architecture (the traps are open to atmosphere), effective flow through the microchannels necessitates closure of the trap roofs. Therefore, before we load the traps with cuboids via the microchannels, we temporarily seal the open traps with removable silicone adhesive tape to enable flow (FIG. 8A). We then load the cuboids in a collagen suspension, which, once gelled, immobilizes them and creates the collagen/hydrogel culture environment. After loading, we remove the silicone tape and replace it with the bottomless 8-well plate (containing adhesive), leaving the traps open. Note that, while it would be technically possible to load each trap manually in our small prototype device by pipetting into each trap, we seek a high-throughput solution that could potentially solve the problem of loading thousands of cuboids.

We based our microfluidic approach for cuboid entrapment on Takeuchi's design, which exploits hydrodynamic principles to achieve the serial entrapment of particles, initially performed on beads. See W. H. Tan and S. Takeuchi, *Proc. Natl. Acad. Sci. U.S.A.*, 2007, 104, 1146-1151. Our microfluidic design (FIGS. 7A and 7B) consists of a continuous bypass channel ($W_b$=315±9 µm, $W_t$=721±12 µm, h=672±10 µm) and a series of lower resistance trapping channels. These trapping channels contain a trapping section/well (W=737 µm, h=1,000 µm) and a narrower channel ($W_b$=99±5 µm, $W_t$=181.6±0.1 µm, h=712±54 µm). Top and bottom dimensions reflect the approximately trapezoidal profiles created by our laser-cutting protocol (FIGS. 9A-9E). With this microfluidic network design, flow "prefers" to go through the open traps (FIG. 7B, path 1) but, when flow brings a particle into a trap, the particle blocks the flow and diverts the flow to the next trap (FIG. 7B, path 2). The hydraulic resistance ratio of the two fluidic paths governs the relative flow rates ($Q_B$ & $Q_T$) through the fluidic circuits. The hydraulic resistance (R) is directly related to the geometric parameters of the channel Channels made with $CO_2$ laser engraving have a trapezoidal geometry with a constant depth and (h), defined by the power and speed parameters of the laser cutter. After applying the Darcy-Weisbach equation (assuming fully developed, steady state and incompressible flow, see Suppl. Info), we calculated the hydraulic resistance along the bypass channel ($R_B$) and along the trapping channel ($R_T$). Their ratio, $R_B/R_T$, was 1.26, implying that the flow rate through the trapping path ($Q_T$) will be ~1.26× higher than the flow rate through the bypass path ($Q_B$).

A key factor for experiments with intact-tissue cuboids is their high density (higher than that of cells), which causes a high speed of sedimentation and can lead to settling and friction at the bottom of the microchannel Therefore, denser solutions—which also tend to be more viscous —, such as collagen (1.013 g/mL and ~50 mPa.$) or polyethylene glycol (PEG) solutions (20% PEG is 1.04 g/mL, µ=15 mPa.$), can be used to minimize sedimentation and friction and improve trapping efficiency.

Figure 9A:
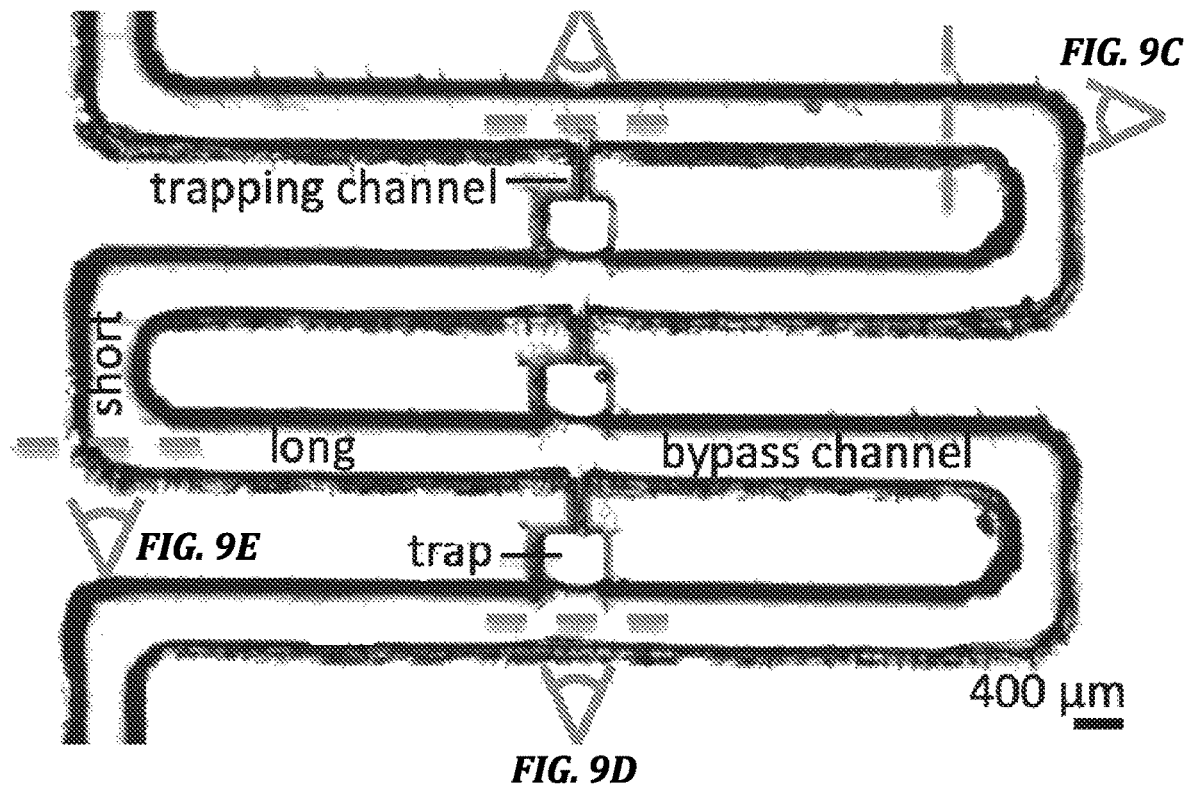
FIG. 9A is a top-down plan view image of the three traps within a single well of a fluidic device, in accordance with an embodiment of the disclosure.
Figure 9B:
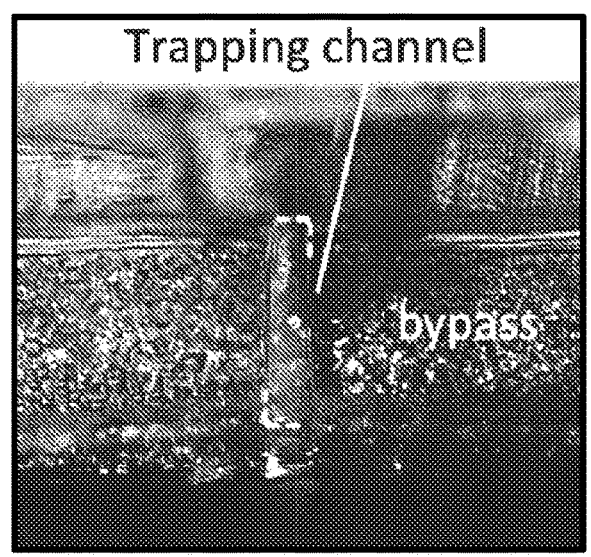
FIG. 9B is an image of a trapping channel from a cross-section of the fluidic device of FIG. 9A, in accordance with an embodiment of the disclosure.
Figure 9C:
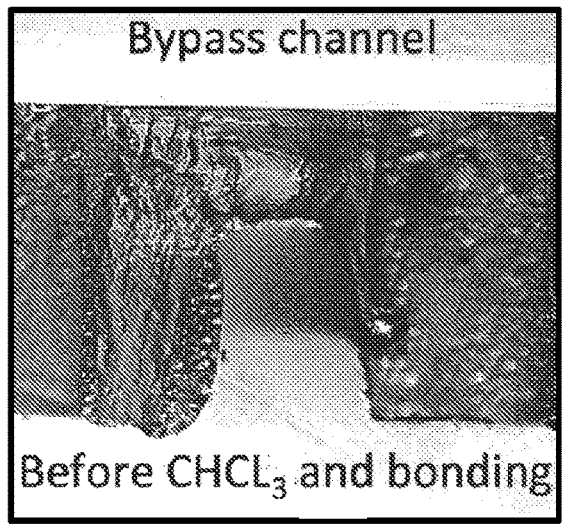
FIG. 9C an image of the bypass channel from a cross-section of the fluidic device of FIG. 9A before $CHCl_3$ and bonding, in accordance with an embodiment of the disclosure.
Figure 9D:
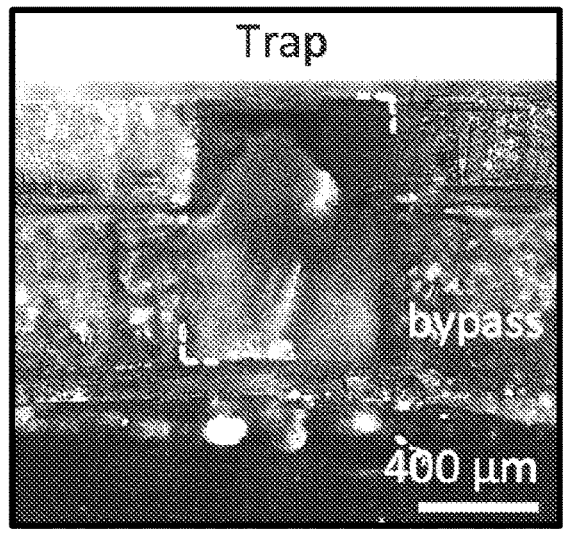
FIG. 9D is an image of a trap from a cross-section of the fluidic device of FIG. 9A, in accordance with an embodiment of the disclosure.
Figure 9E:
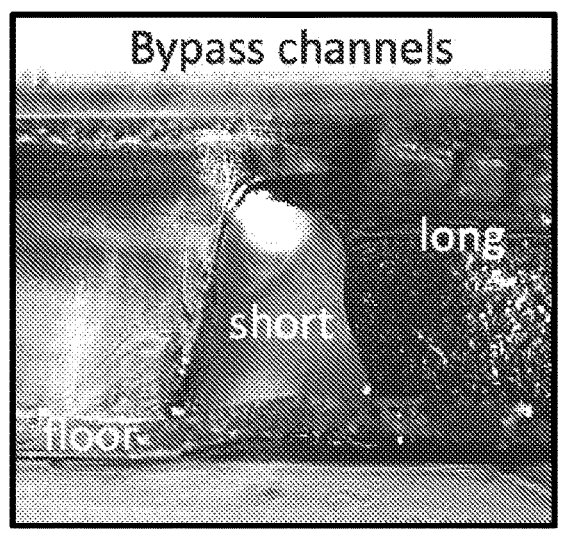
FIG. 9E an image of another image of the bypass channel from a cross-section of the fluidic device of FIG. 9A, in accordance with an embodiment of the disclosure.
Figure 9F:
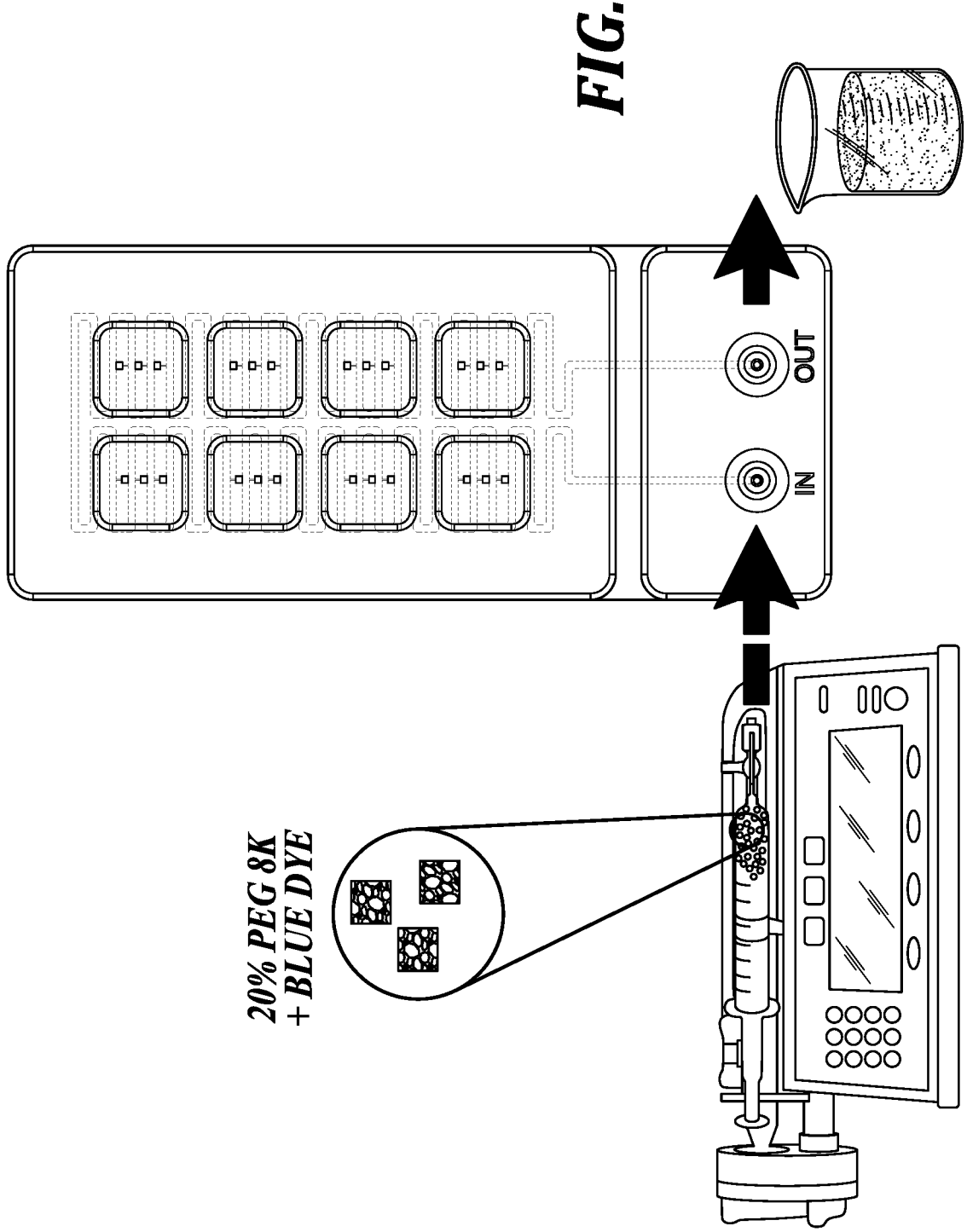
FIG. 9F schematically illustrates an experimental set up of a device, in accordance with an embodiment of the disclosure.
Figure 9G:
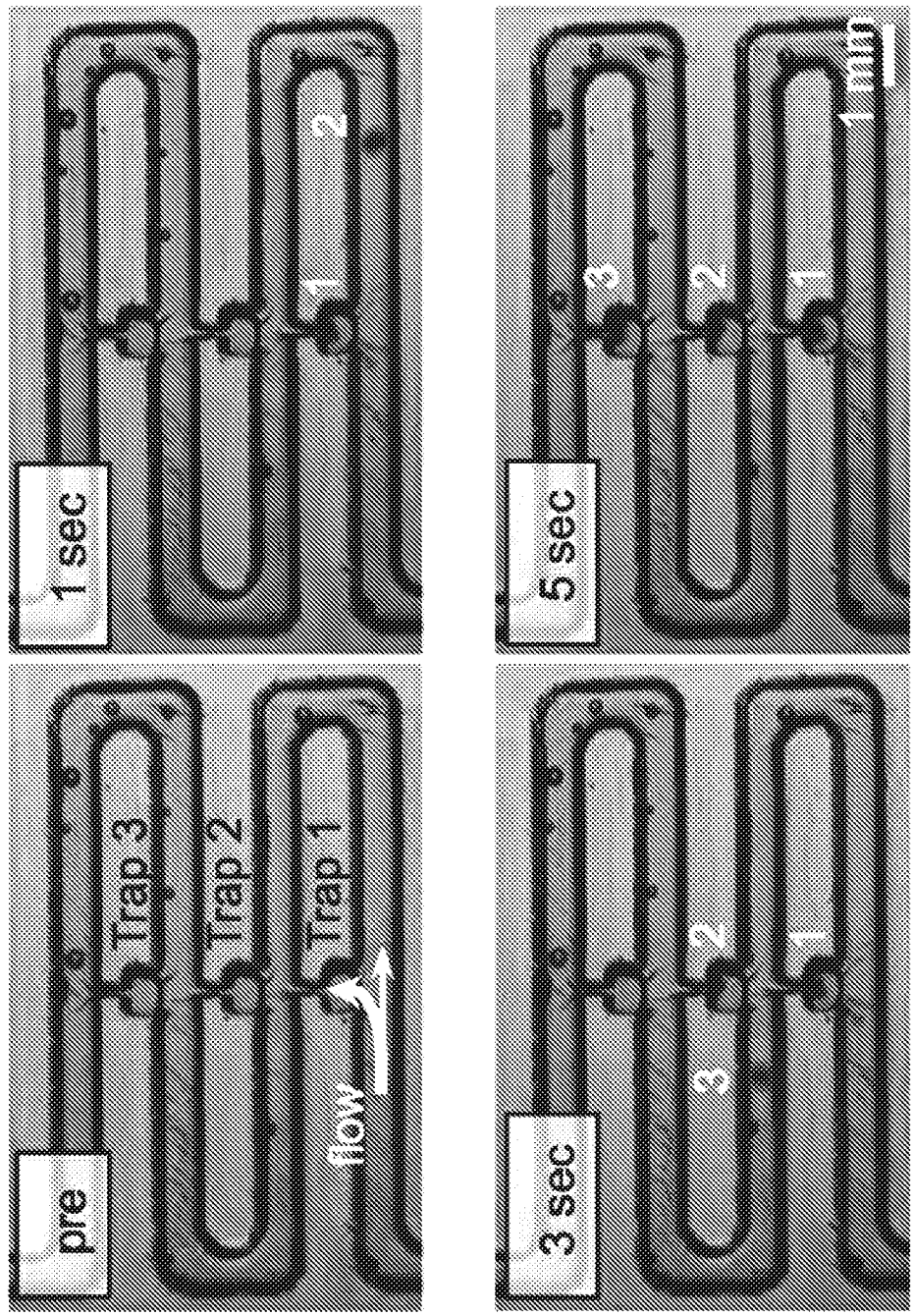
FIG. 9G are images of cuboids travelling through a channel of a device shown as a time sequence, in accordance with an embodiment of the disclosure.

We next experimentally evaluated the loading efficiency of cuboids into the trap under relatively controlled conditions. For these experiments (setup in FIG. 9F), we used sparse, fixed U87 glioma cuboids manually selected for similar size (~300-500 µm). In preliminary experiments we observed that cuboids tended to rapidly settle to the bottom of the channels, which affected the trapping efficiency and could cause clogging. Therefore, we suspended the cuboids in a 20% PEG solution (lightly colored with blue dye), which was dense enough to result in slow settling of cuboids at rest. For these experiments we controlled the flow rate (20 mL/h) with a syringe pump. We found that cuboids would indeed fill the traps (FIG. 9G), but with less than 100% efficiency and with occasional sticking (that could be overcome by a brief, abrupt change in flow rate). Therefore, to quantitate trapping efficiency, for each of two devices we evaluated the filling of the first trap while all other traps were empty (in order to minimize any confounding effects on resistance). Cuboid removal by manual flow in reverse permitted us to perform multiple trials on the same trap. We found that the trapping efficiency was 84% (26/31) for device 1, and 69% (22/32) for device 2. Interestingly, for the cuboids not trapped by the first well, the trapping efficiency was 100% at the second well (5/5 for device 1 and 10/10 for device 2), which suggests that the different geometry of the surrounding fluidics (e.g. presence or absence of upstream trap directly in line) can affect trapping efficiency.

$CO_2$ Laser Micromachining

The current version of our microfluidic consists of an 8-well plate with an integrated channel network layer. We fabricated the device by laser micromachining of PMMA substrates, thermal fusion and adhesive bonding. The device is composed of four layers: a 1,000 µm-thick PMMA channel network layer (Astra Products, Baldwin, N.Y. (11510103)) containing the trapping microchannel connected in series to 8 sets with 3 traps/set, a 200 µm-thick PMMA sealing layer (AFT00, SPolytech, Chungbuk, Korea), a 76 μm-thick removable polysil double-coated silicone adhesive tape (S1001-1DC1, Adhesive Applications, Easthampton, Mass.), and an insertable 6.35 mm-thick PMMA bottomless 8-well "well plate" (1227T569, McMaster-Carr, Elmhurst, Ill.) lined with a 50 μm-thick 3M™ High-Strength Acrylic Adhesive 300LSE. In addition to the main components, the device also has a customized base and a lid (1227T569, McMaster-Carr, Elmhurst, Ill.). The base raises the device from the surface to avoid scratches (thus maintaining optical clarity) and makes its dimensions compatible with conventional imaging slide stages. The lid prevents contamination and allows proper air flow for tissue culture.

The $CO_2$ laser system used (VLS3.60, Scottsdale, USA) has a wavelength of 10.6 μm and a maximum power of 30 W. We utilized AutoCAD 2017 for device design and optimized the power and speed settings of the $CO_2$ laser to achieve specific widths and depths for the microchannels and to cut the outlines of the channel network and sealing layers. For optimal alignment, we manually lined the bottomless well-plate with the high-strength acrylic 300LSE adhesive prior to laser cutting.

Post-Ablation Processing

Laser ablation of PMMA includes both polymer debris and reflow. To remove debris from the laser-cut substrates, we rinsed each of the device components with DI water and sonicated them in an IPA bath for 30 sec. To reduce surface roughness and improve the optical quality, we exposed the channel network to chloroform vapor. We used a glass container (264 mm (L)×213 mm (W)×165 (T) mm) filled with 50 mL of chloroform and steel standoffs (6 mm) to elevate the laser-micromachined layers 3 mm above the chloroform surface. We concurrently exposed the channel network layer and the sealing layer to chloroform for 5 min.

Thermal Fusion and Adhesive Bonding

Exposure to chloroform vapor also causes the PMMA to become slightly adhesive by inducing polymer reflow. After chloroform vapor treatment, the surface of the PMMA substrates becomes soft due to polymer solvation. When two treated surfaces are placed in contact with each other, a cohesive molecular bond is formed while excess vapor evaporates from the interface. For assembly, we exposed the channel network layer and the sealing layer to chloroform vapor. For thermal fusion bonding, we, first, hand-pressed the sealing layer onto the channel network layer to form a weak bond. Then, to ensure uniform bonding, we sandwiched the two layers between two ~3 mm thick PDMS slabs with the same outer dimensions as the channel network layer. Finally, we placed the whole ensemble in the heat press for 4 min at 150 psi and 60° C.

Prior to cuboid loading, we sealed the trap openings with the removable polysil double coated silicone adhesive tape using the same pressing setup, at room temperature. After loading, we manually removed the silicone adhesive from the channel network. To bond the bottomless 8-well plate to the channel layer, we removed the 3M300LSE liner and manually pressed both components together.

Hydrophilization and Bubble Removal

After device assembly and prior to use, we treated each device with oxygen plasma for 5 min at ~950 mTorr (60 watts, Diener RF plasma oven) to increase the hydrophilicity of the PMMA surfaces. Then, to prepare the device for use, we manually filled the device with 100% ethanol to remove bubbles from trapping areas. Once the device was bubble-free, we manually injected sterile DI water into the microchannels, followed by sterile PBS.

Device Operation

The device is designed to be operated in two main stages: 1) cuboid loading with the polysil double-coated silicone adhesive tape, 2) cuboid culture after manual removal of the silicone adhesive tape, and attachment of the bottomless 8-well plate. Prior to loading, we ensured that the trap openings were completely bubble-free and filled the device with ethanol, then water, then PBS. Devices to be utilized for culture were sterilized with 70% ethanol and followed by use of sterile solutions. Cuboid loading was accomplished by manual injection or by pump infusion.

For our loading efficiency experiments, we manually suspended fixed glioma cuboids in a 5 mL syringe containing 20% 8 k-PEG (P2139, Sigma-Aldrich). To load the cuboids, we connected the inlet of the device to the 5 mL syringe and used a syringe pump (Fusion 200, Chemyx Inc., Stafford, Tex.) at a flow rate of 20 mL/hr. For our live glioma cuboid experiments, we suspended glioma cuboids in a 5 mL syringe containing collagen. We manually loaded the cuboids after connecting the inlet of the device to the 5 mL syringe. After loading, we peeled the silicone adhesive from the channel layer and bonded the bottomless 8-well plate using the adhesive on its bottom surface and firm manual pressure. Then we carefully added reagents to each well (usually 0.2 mL/well).

Characterization of Diffusion Cross-Talk

Diffusional cross-talk between wells was evaluated by filling the wells with fluorescent dyes. First, we manually filled the microchannels with collagen as above. After gelation of the collagen, we replaced the silicone adhesive tape with tape that had a window cut over only one well, keeping all other wells closed. Then we glued the wells on top and clamped the inlet and outlet shut with clips. After pipetting 200 μL of 1 mM fluorescein (MW=332 g/mol) into the one well with exposed traps, we covered the well with clear tape to prevent evaporation. We left the device on the microscope at room temperature and took tiled 2× brightfield and fluorescent images at different intervals over 3 days. We subtracted the fluorescence background over similar regions not exposed to fluorescein from the mean fluorescence measured at intervals along the diffusion path.

Figure 10A:
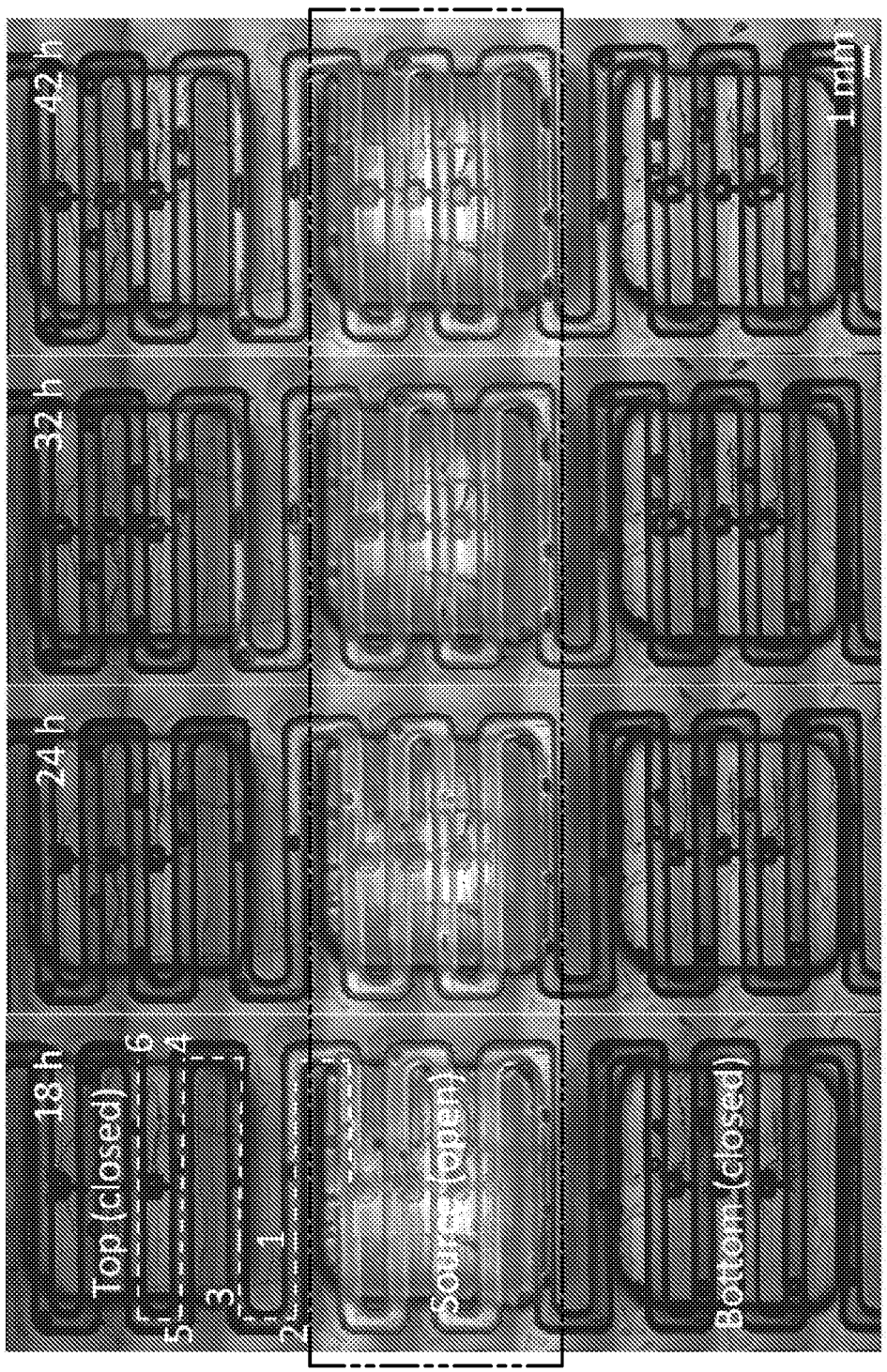
FIG. 10A includes fluorescence overlay and brightfield images of a collagen-filled device loaded with fluorescein dye in a source well taken at various times after contacting a fluidic layer of the device with fluorescein, in accordance with an embodiment of the disclosure.
Figure 10B:
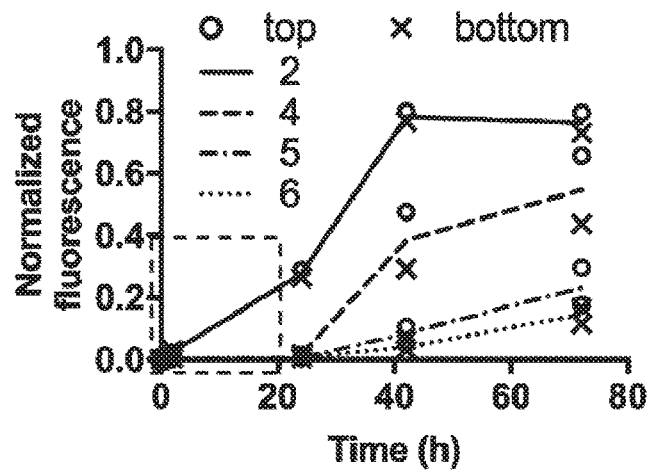
FIG. 10B graphically illustrates normalized fluorescence as a function of time taken at different locations numbered in FIG. 10A, in accordance with an embodiment of the disclosure.
Figure 10C:
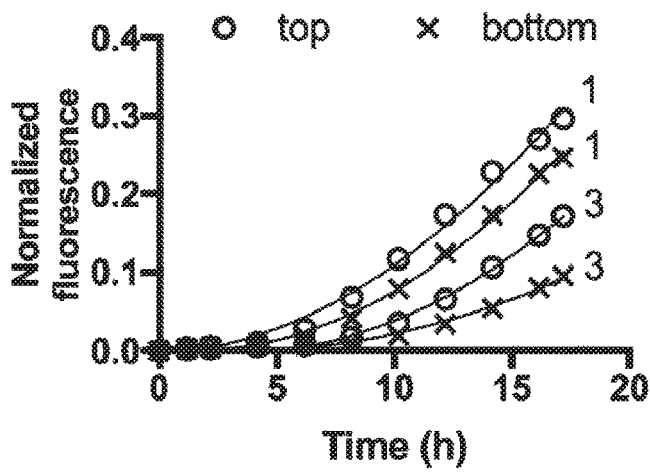
FIG. 10C graphically illustrates normalized fluorescence as a function of time taken at different locations numbered in FIG. 10A, in accordance with an embodiment of the disclosure.
Figure 10D:
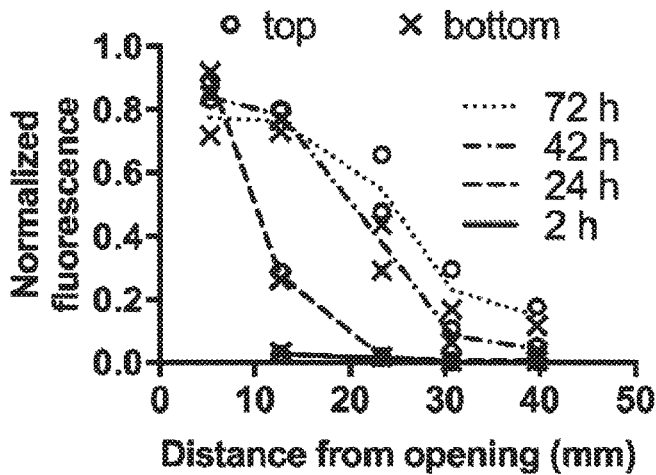
FIG. 10D graphically illustrates normalized fluorescence as a function of distance taken along the dotted line in FIG. 10A, in accordance with an embodiment of the disclosure.
Figure 11A:
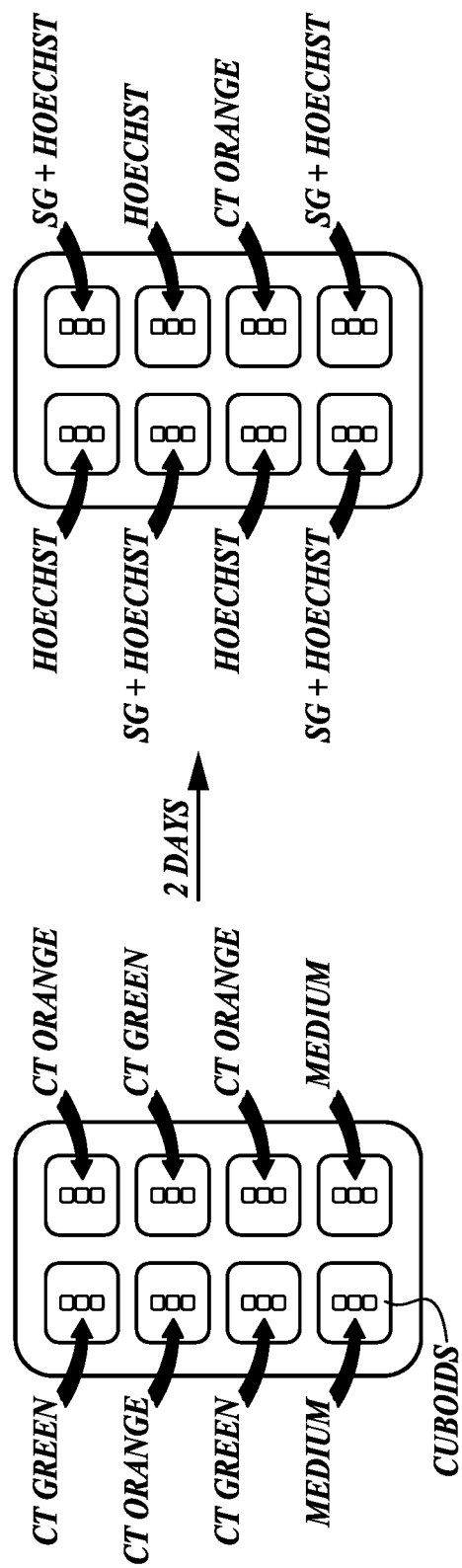
FIG. 11A schematically illustrates loading wells of a device with dyes, in accordance with an embodiment of the disclosure.
Figure 11B:
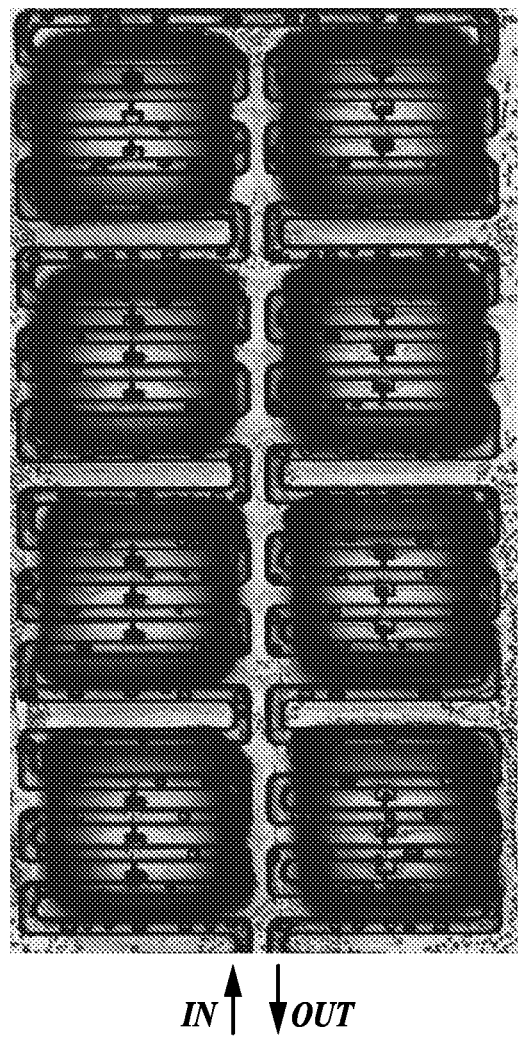
FIG. 11B is a brightfield image of a device, in accordance with an embodiment of the present disclosure, with arrows indicating the direction of cuboid loading.
Figure 11C:
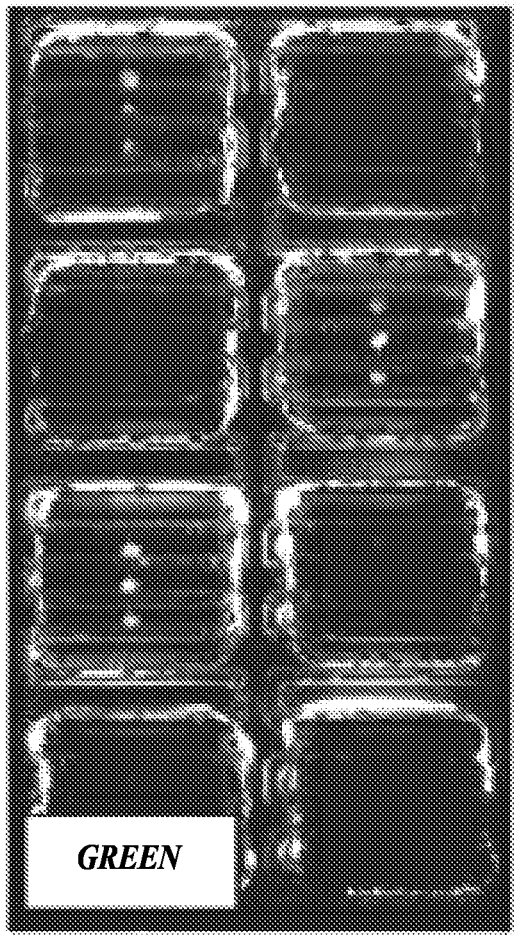
FIG. 11C includes images a fluorescence overlay of a brightfield image (left) of green fluorescence and (right) red fluorescence of the device of FIG. 11B showing continued strong CT fluorescence after 2 days indicating cell viability, in accordance with an embodiment of the disclosure.
Figure 11C:
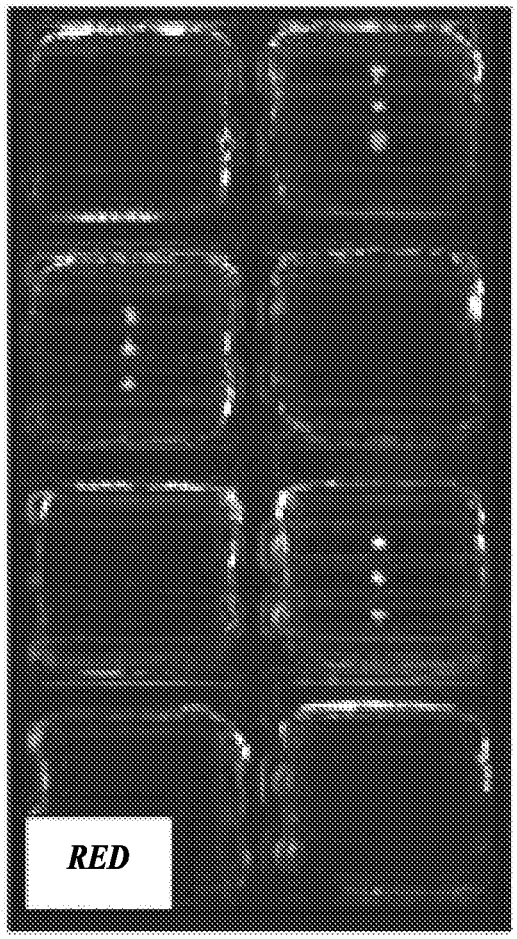
Figure 11D:
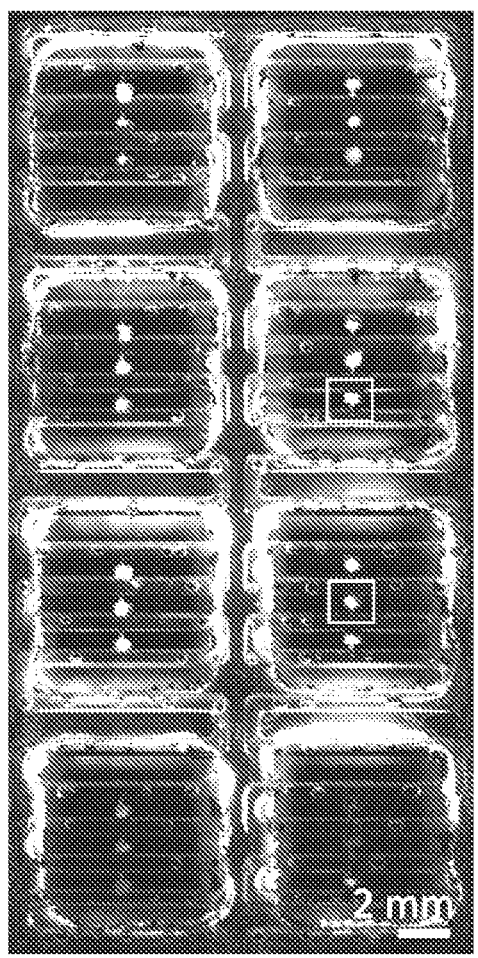
FIG. 11D is a fluorescence overlay of a brightfield image of the device of FIG. 11B showing subsequent cell death staining with Hoechst+/−SG, in accordance with an embodiment of the disclosure.
Figure 11E:
FIGS. 11E and 11F are magnified images of the boxed regions in FIGS. 11E and 11F, in accordance with an embodiment of the disclosure.
Figure 11F:
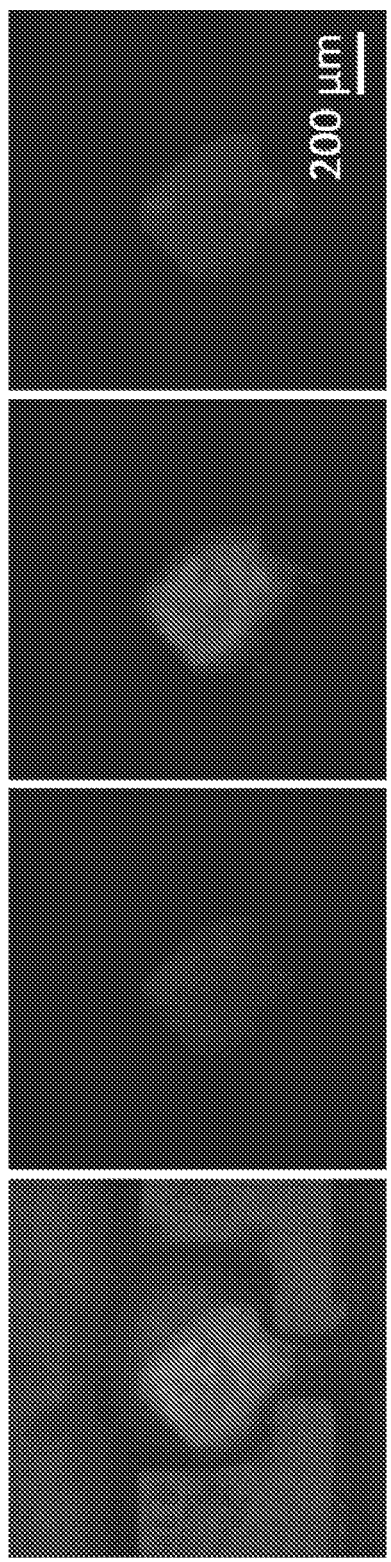

In order to evaluate potential crosstalk between wells of the device, we performed experiments with fluorescein as described above. An open channel ~30 mm long (x) connects the last trap of one well to the narrow opening of the first trap of the next well. We measured the diffusion of fluorescein (1 mM) from one well in a device filled with collagen over 72 hrs (FIGS. 10A-10D). To prevent bulk flow of fluid that would confound results, we sealed the openings of all other traps to other wells with silicone tape, plugged the inlet and outlet, and sealed the top of the fluorescein well with tape. From images taken different time intervals, we measured the fluorescence intensity at different distances from the last open trap of the fluorescein well towards both sides (FIGS. 10B-10D). After 42 hrs, we found that at ~30 mm along the microchannel from the last trap under the fluorescein well (ending at a point halfway between the small and large openings of the closest trap of the neighboring well), the fluorescence reached approximately 10% of the initial value. Beyond the first neighboring trap, the levels were much lower with no apparent increase in fluorescence.

Next, we applied Fick's second law of diffusion to calculate for our experiments the effective diffusivity of fluorescein in collagen-filled microchannels:

$$\frac{\partial C}{\partial t} = D\frac{\partial^2 C}{\partial x^2}$$

A solution to Fick's second law of diffusion in semi-infinite media and a constant concentration source is given by:

$$C(x, t) = \frac{C_x - C_0}{C_s - C_0} = 1 - \text{erf}\left(\frac{x}{2\sqrt{Dt}}\right) = \text{erfc}\left(\frac{x}{2\sqrt{Dt}}\right)$$

where D represents the effective diffusivity of fluorescein in collagen, $C(x=0)=C_s$ is the concentration of fluorescein at the source and $C(x=\infty)=C_0$ corresponds to the concentration at the first trap of the next well. We assume that $C_s$ remains constant over time, and $C_0=0$. The characteristic diffusion length (L) at a given time (t) is defined as the distance at which the concentration of the diffusing species reaches 50% of the source concentration ($C_s$) and can be approximated by $L \approx \sqrt{Dt}$. With a similar rationale, the solution for D can be approximated using 15% of the source concentration instead, with $L \approx 2.04\sqrt{Dt}$. Using this relationship, we used a quadratic fit to estimate the effective diffusivity of fluorescein at C (x,t)=0.15 using the experimental $\partial C/\partial t$ curves for different locations (10 and 12.5 mm away from the source) over the first 16 hours (FIG. 10C). These calculation yielded an effective diffusivity of fluorescein in collagen for our system of $6.04 \times 10^{-10}$ m²/s, close to the reported diffusion constant of fluorescein (D=$4.25 \times 10^{-10}$ m²/s)$^{54}$. However, at longer time points (>16 hours) the movement of fluorescein appeared to be approximately 4-fold faster. Thus, we suspect there must be an alternative transport mechanism, such as residual flow caused by hydrostatic pressure or evaporation (the sealing of outlet and the open well was incomplete), that disrupted the assumption of a stationary medium in Fick's laws of diffusion. In future devices we could ensure a stationary medium at any given point in time with physical barriers such as valves.

Selective Dye Delivery to Cultured Cuboids in the Device

We next performed experiments to demonstrate culture of cuboids and selective dye application in the device (FIGS. 11A-11F). For these experiments we manually loaded U87 glioma cuboids in a collagen solution, immediately after cutting. After gelation of the collagen in the incubator, we labeled live cells in the cuboids for one hour with alternating patterns of green and red live fluorescent dyes (CellTracker Green and CellTracker Orange) Imaging after 2 days in culture (FIG. 11B) showed robust labeling of both dyes, indicating continued viability of the cuboids and no evidence for cross-talk between wells. To further confirm the viability of the cuboids, we then stained the CellTracker Orange-labeled wells with the cell death nuclear marker, SYTOX green and the pan-nuclear marker, Hoechst. We also stained the CellTracker Green-labeled wells with Hoechst alone. As shown in FIGS. 11C-11F, CellTracker live staining and SG cell death staining showed minimal cell death. If desired, confocal imaging or similar (combined with tissue clearing analysis of the whole cuboid), could give a cellular level analysis of viability.

Drug Treatment on the Microfluidic Device

Figure 12A:
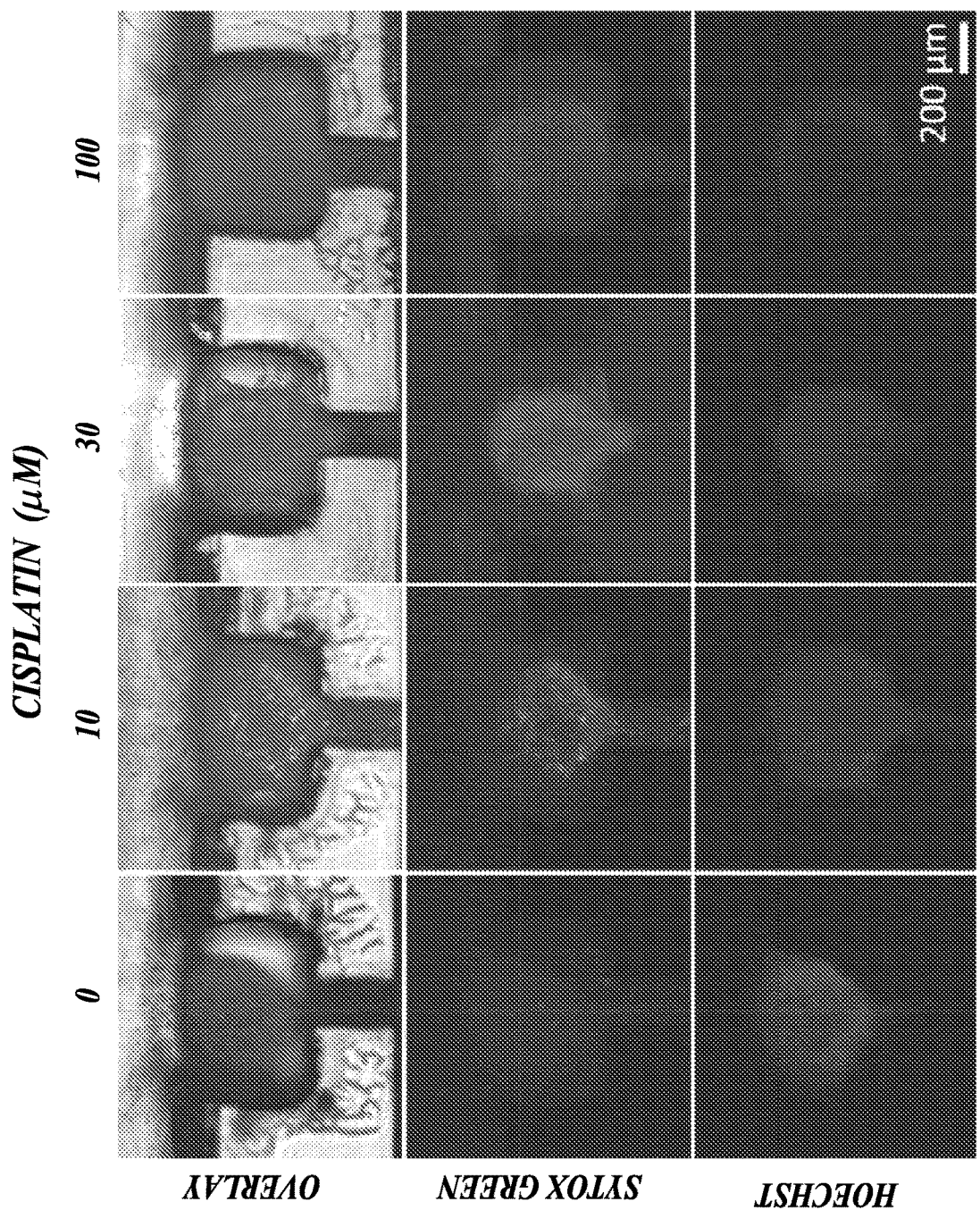
FIG. 12A includes images of trapped U87 tissue portions stained with various dyes and treated with cis-platin, in accordance with embodiments of the present disclosure.
Figure 12B:
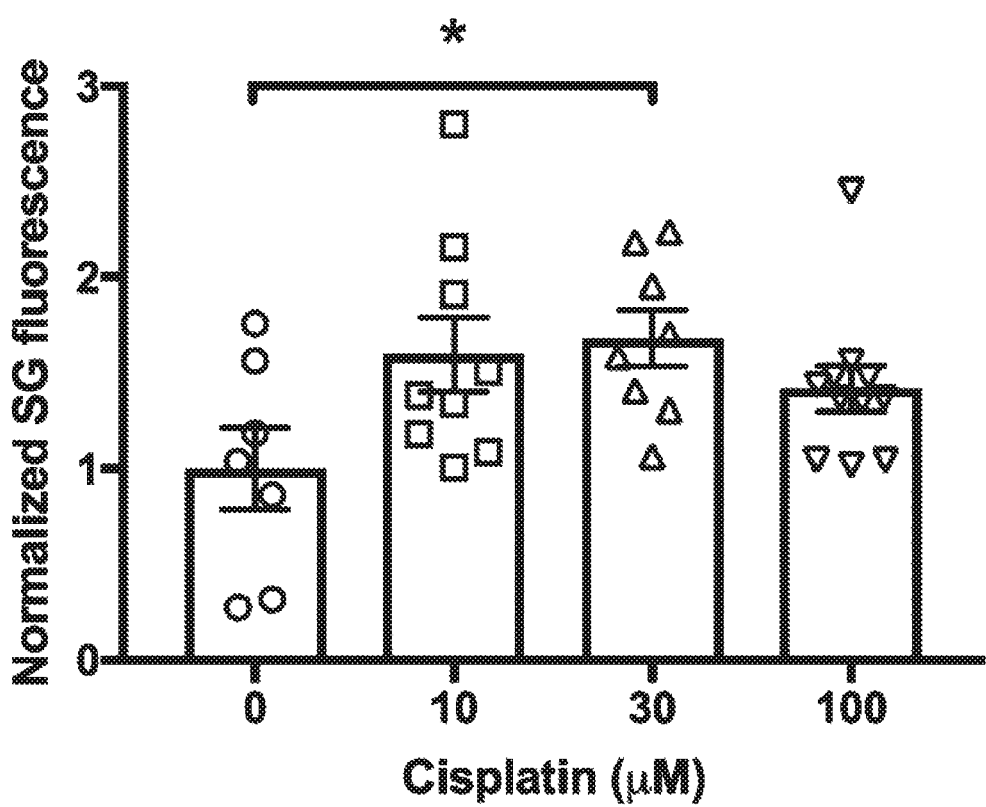
FIG. 12B graphically illustrates quantitation of cell death by SYTOX Green (death) fluorescence, where mean fluorescence was normalized to the average value of control conditions, and individual points and average±s.e.m. N=7-11.

As a first test of drug treatment with the device, we exposed U87 cuboids in the device with different concentrations of a cytotoxic chemotherapy drug, cisplatin (FIGS. 12A and 12B). In each of two devices, we treated two wells with each concentration of cisplatin (0, 10, 30, 100 µM) for 2 days from day 1 to day 3 (FIG. 12A). As a straightforward simple measure of cell viability, we measured the mean fluorescence ratio in epifluorescence images of SG dead nuclear fluorescence to Hoechst pan-nuclear fluorescence (FIG. 12B). We found a statistically significant response to 30 µM CP, with 100 µM showing a trend. The weak SG staining at higher concentrations was accompanied by concomitant weak of Hoechst staining consistent with breakdown of nuclei in later stages of cell death. Note the variability in responses, not unexpected to the small size of the cuboids as well as some of the baseline viability noted (FIG. 6C). Future experiments could increase the sensitivity of the assay by incorporating pre-treatment viability tests to exclude from analysis the already less viable cuboids (15% here for off-device controls run in parallel, FIGS. 6C and 6D). These results were similar to our previous experiments with U87 glioma slices on and off a microfluidic device that showed cell death in response to 30 and 100 µM cisplatin by SG/H live viability staining. While confocal imaging could provide more precise evaluation, it is more time consuming. This device platform is also compatible with analysis of the supernatant in the wells for cell death, e.g. LDH levels by fluorescent assay, but would require more manipulation and would lose the independence of measurements for individual cuboids.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about", "substantially" or "approximately means plus or minus 5% of a stated value.

While illustrative embodiments have been illustrated and described, it will be appreciated that various changes can be made therein without departing from the spirit and scope of the invention.

The embodiments of the invention in which an exclusive property or privilege is claimed are defined as follow:

1. A fluidic device for trapping tissue samples, the fluidic device comprising:
   an array of traps, wherein traps of the array of traps are configured to trap a tissue sample; and
   a well that is in registry with, and in fluidic communication with, a trap of the array of traps, wherein the well is inflatable to define the well.

2. The device of claim 1, wherein the array of traps includes at least one trap selected from the group consisting of: an optical trap, an ultrasound trap, a magnetic trap, and a fluidic trap.

3. The fluidic device of claim 1, wherein the fluidic device includes a fluidic layer comprising a channel having an upstream end and a downstream end opposite the upstream end, wherein traps of the array of traps are in fluidic communication with the channel.

4. The fluidic device of claim 3, further comprising a well-plate layer defining the well, wherein the well-plate layer is couplable to the fluidic layer to place the well in registry with the trap of the array of traps.

5. The fluidic device of claim 4, wherein the trap of the array of traps is in fluidic communication with the channel at a first portion, wherein the fluidic device further comprises a trap channel in fluidic communication with the trap and the channel at a second portion downstream from the first portion.

6. The fluidic device of claim 5, wherein the trap channel has a fluidic resistance lower than a fluidic resistance of a portion of the channel between the first portion and the second portion.

7. The fluidic device of claim 5,
wherein the trap is a first trap;
wherein the trap channel is a first trap channel;
wherein a second trap of the array of traps is in fluidic communication with the channel at a third portion downstream from the first portion; and
the fluidic device further comprising a second trap channel in fluidic communication with the second trap and the channel at a fourth portion downstream from the third portion.

8. The fluidic device of claim 7, wherein the well is in registry and fluidic communication with the second trap when the well-plate layer is coupled to the fluidic layer.

9. The fluidic device of claim 7, wherein the well is a first well, and wherein the well-plate layer defines a second well in registry and fluidic communication with the second trap when the well-plate layer is coupled to the fluidic layer.

10. The fluidic device of claim 4, further comprising a roof layer removably couplable to a side of the fluidic layer couplable to the well-plate layer, wherein the roof layer is configured to cover and be in fluidic communication with the trap when coupled to the fluidic layer.

11. The fluidic device of claim 4, wherein traps of the array of traps include an aperture defined by the fluidic layer shaped to allow fluid flow through the fluidic layer and trap a tissue sample.

12. The fluidic device of claim 1, wherein the trap has a feature size in a range of about 50 μm to about 800 μm.

13. The fluidic device of claim 1, wherein the trap accepts a generally cuboidal tissue sample.

14. A system, comprising:
the fluidic device of claim 1; and
a tissue cutting device configured to cut a tissue sample into approximately regular portions shaped to fit within a trap of the array of traps.

15. The system of claim 14, wherein the tissue cutter is configured to cut the tissue sample into approximately cuboidal portions.

16. The system of claim 14, further comprising a controller including logic that, when executed by the controller, causes the system to perform operations including:
flowing a fluid suspension comprising a tissue sample through a channel of the fluidic device, thereby trapping the tissue sample in the trap; and
exposing the trapped tissue sample to compound by depositing the compound into the well.

17. A method of manipulating a tissue sample, the method comprising:
contacting a fluid suspension comprising a tissue sample with the fluidic device of claim 1;
flowing fluid of the fluid suspension through a channel of the fluidic device, thereby trapping the tissue sample in a trap of the fluidic device; and
exposing the trapped tissue sample to compound by depositing a solution comprising the compound into a well in registry and fluidic communication with the trap.

* * * * *